United States Patent
Takemura et al.

(10) Patent No.: US 8,213,432 B2
(45) Date of Patent: Jul. 3, 2012

(54) NETWORK CONFIGURATION INVESTIGATING DEVICE, NETWORK CONFIGURATION INVESTIGATING PROGRAM, NETWORK CONFIGURATION MANAGEMENT METHOD, AND NETWORK CONFIGURATION MANAGEMENT SYSTEM

(75) Inventors: Itaru Takemura, San Jose, CA (US); Kyoichi Terao, Nerima-ku (JP)

(73) Assignee: Pioneer Corporation, Tokyo (JP)

( * ) Notice: Subject to any disclaimer, the term of this patent is extended or adjusted under 35 U.S.C. 154(b) by 190 days.

(21) Appl. No.: 12/594,083

(22) PCT Filed: Mar. 30, 2007

(86) PCT No.: PCT/JP2007/057162
§ 371 (c)(1),
(2), (4) Date: Mar. 16, 2010

(87) PCT Pub. No.: WO2008/126271
PCT Pub. Date: Oct. 23, 2008

(65) Prior Publication Data
US 2010/0214951 A1 Aug. 26, 2010

(51) Int. Cl.
*H04L 12/28* (2006.01)
(52) U.S. Cl. .......................... 370/392; 709/238; 709/245
(58) Field of Classification Search .................. 370/389, 370/392; 709/201–207, 238, 243, 245
See application file for complete search history.

(56) References Cited

U.S. PATENT DOCUMENTS

| | | | | |
|---|---|---|---|---|
| 7,730,207 B2 * | 6/2010 | Zhang et al. | .................. | 709/242 |
| 2003/0050966 A1 * | 3/2003 | Dutta et al. | .................. | 709/203 |
| 2004/0254977 A1 * | 12/2004 | Zhang | .......................... | 709/201 |
| 2005/0254429 A1 | 11/2005 | Kato et al. | | |
| 2006/0168318 A1 * | 7/2006 | Twiss | ............................. | 709/238 |
| 2007/0064702 A1 * | 3/2007 | Bates et al. | ................... | 370/392 |
| 2008/0049619 A1 * | 2/2008 | Twiss | ........................... | 370/236 |

FOREIGN PATENT DOCUMENTS

| | | |
|---|---|---|
| EP | 1 519 520 | 3/2005 |
| JP | 10-243026 | 9/1998 |
| JP | 2004-166081 | 6/2004 |
| JP | 2005-025315 | 1/2005 |
| WO | WO 2004/004252 | 1/2004 |

OTHER PUBLICATIONS

International Search Report for PCT/JP2007/057162, mailed May 1, 2007.
Kobayashi, Motonari et al, "Hybrid Multi-hop Network ni okeru Routing no tameno Topology Kanri Hoshiki", IEICE Technical Report, vol. 104, No. 353, (Oct. 14, 2004), pp. 21-24.
Extended European Search Report dated Dec. 10, 2010, issued in corresponding European Application No. 07740598.3-2413.

* cited by examiner

*Primary Examiner* — Jung Park
(74) *Attorney, Agent, or Firm* — Nixon & Vanderhye P.C.

(57) ABSTRACT

A network configuration management method has a step of sequentially propagating a network ticket that a network configuration monitoring node has issued to each of a predetermined number of nodes (predetermined number of nodes<number of all nodes) from the node to the node so as to cover all nodes of a P2P network, a step in which each of the nodes having received the network ticket plays a role to investigate the node adjacent to its own node, creates information on a network configuration around its own node, and transmits the information on the network configuration created by each of the nodes to the network configuration monitoring node. Furthermore, in the network configuration management method, the network configuration monitoring node grasps the configuration of the entire P2P network from the collected information on the network configuration.

12 Claims, 20 Drawing Sheets

[ FIG.1 ]
PRIOR ART
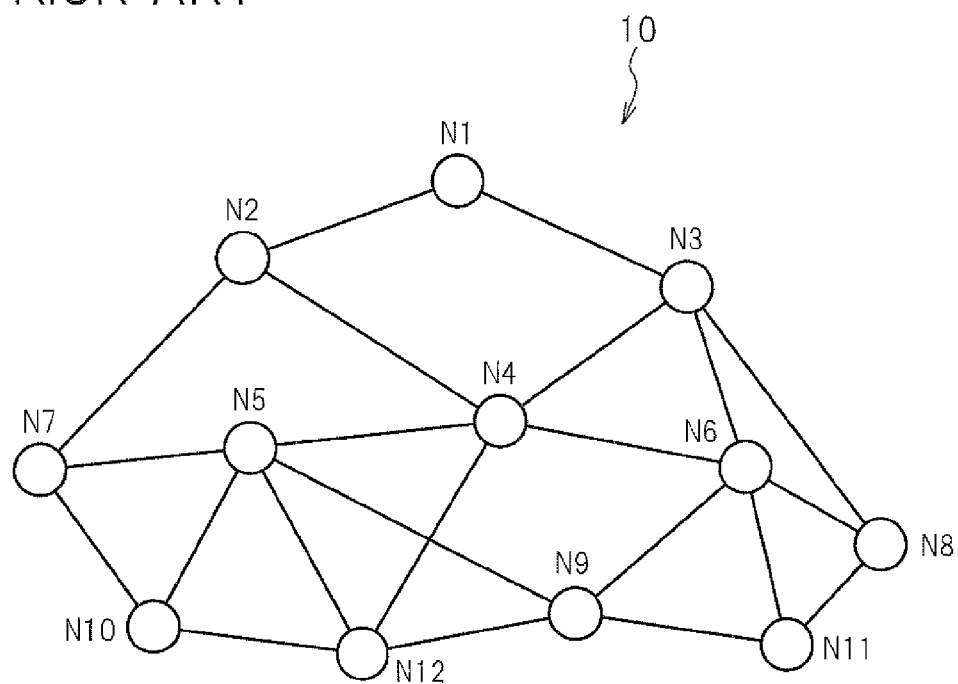

[ FIG.2 ]
PRIOR ART
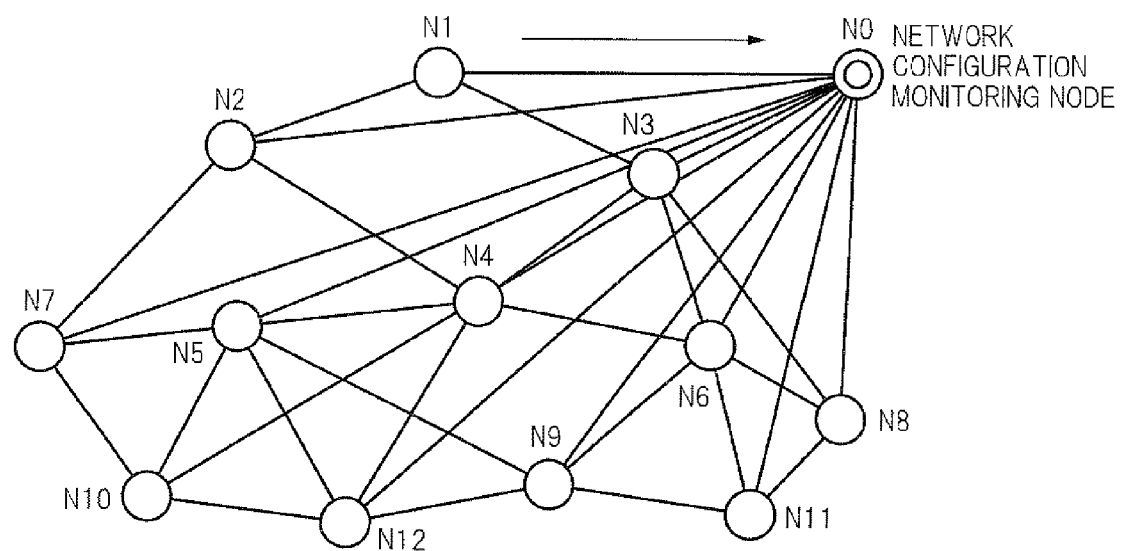

[ FIG.3 ]
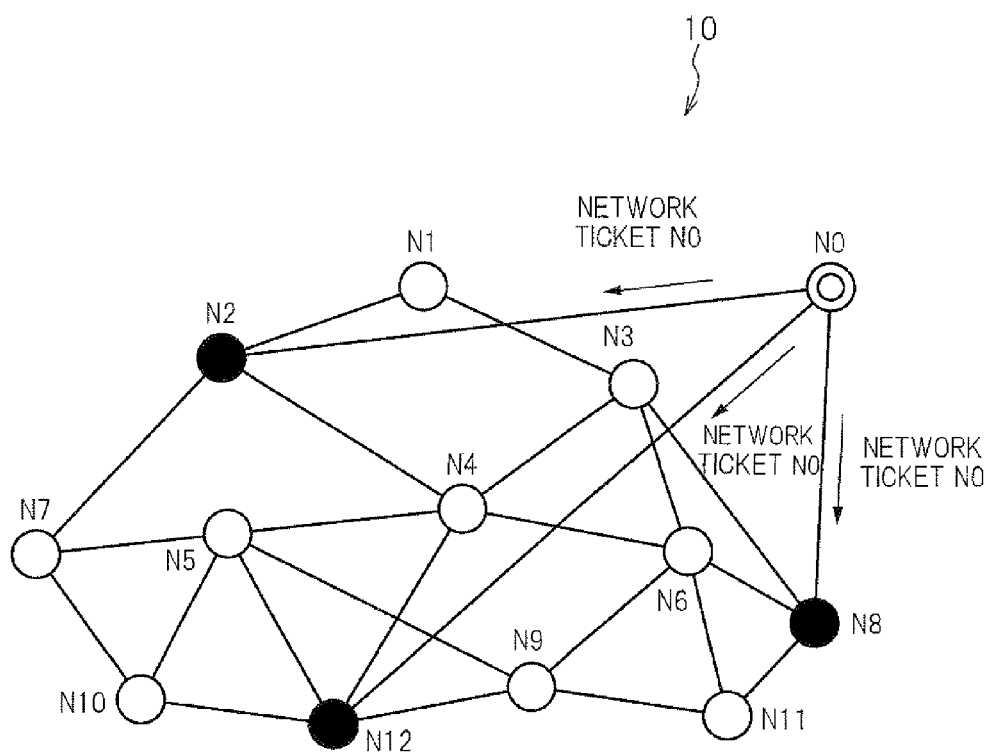
← NETWORK TICKET INVESTIGATING NETWORK CONFIGURATION WITHIN TWO HOPS FROM N2, N8, AND N12
◎ NETWORK CONFIGURATION MONITORING NODE
● NODE TO WHICH ONE OF NETWORK CONFIGURATION MONITORING FONCTION IS TRANSFERRED

[ FIG.4 ]
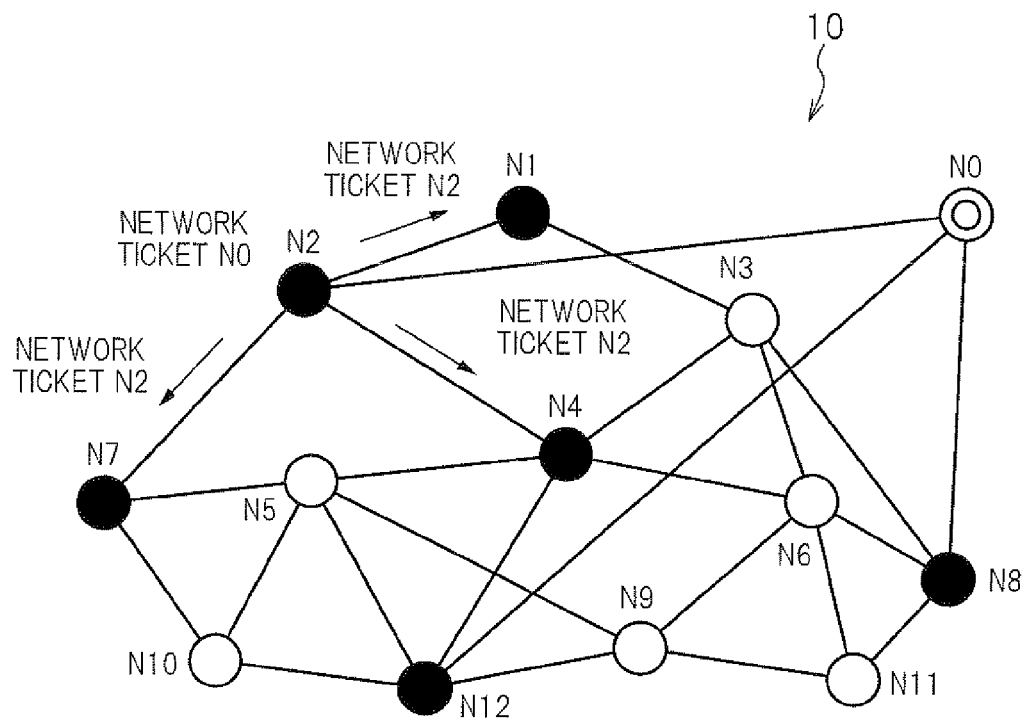
→ NETWORK TICKET INVESTIGATING NETWORK CONFIGURATION WITHIN ONE HOP FROM N1, N4, AND N7
◎ NETWORK CONFIGURATION MONITORING NODE
● NODE TO WHICH ONE OF NETWORK CONFIGURATION MONITORING FONCTION IS TRANSFERRED

[ FIG.5 ]
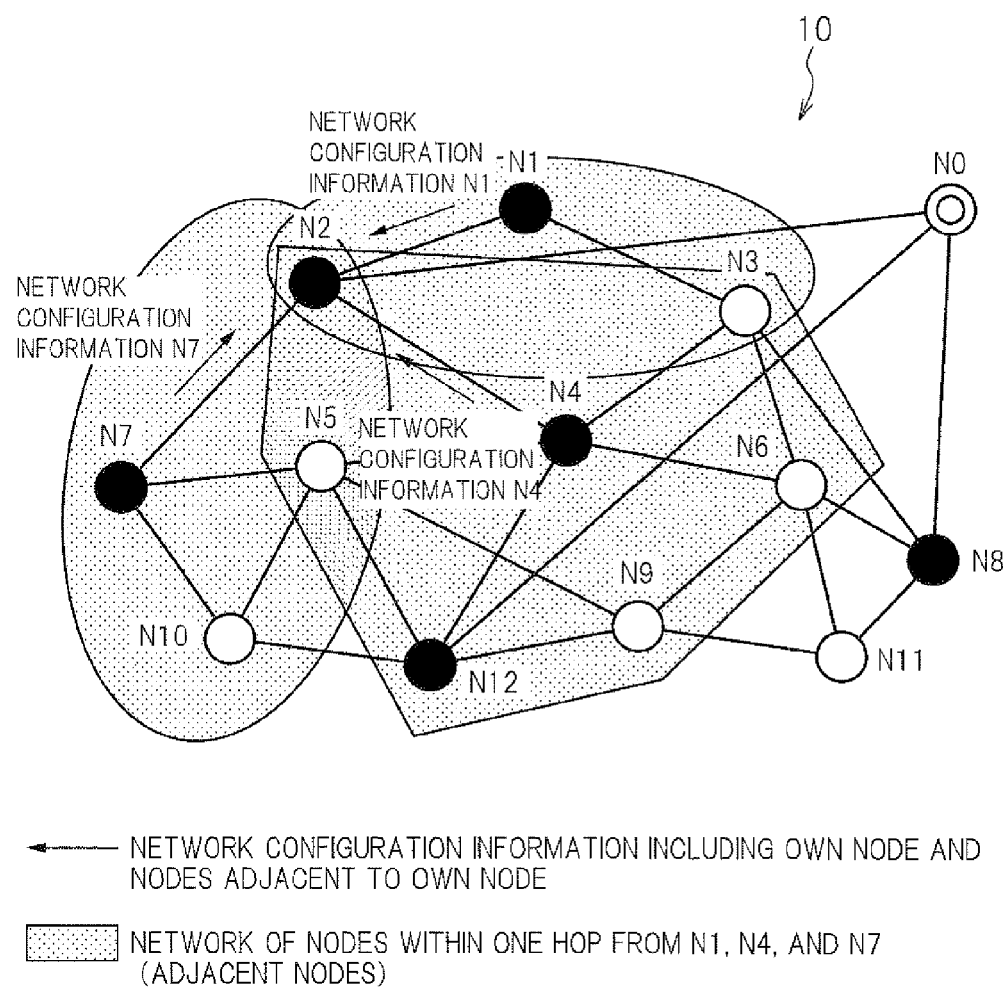

[ FIG.6 ]
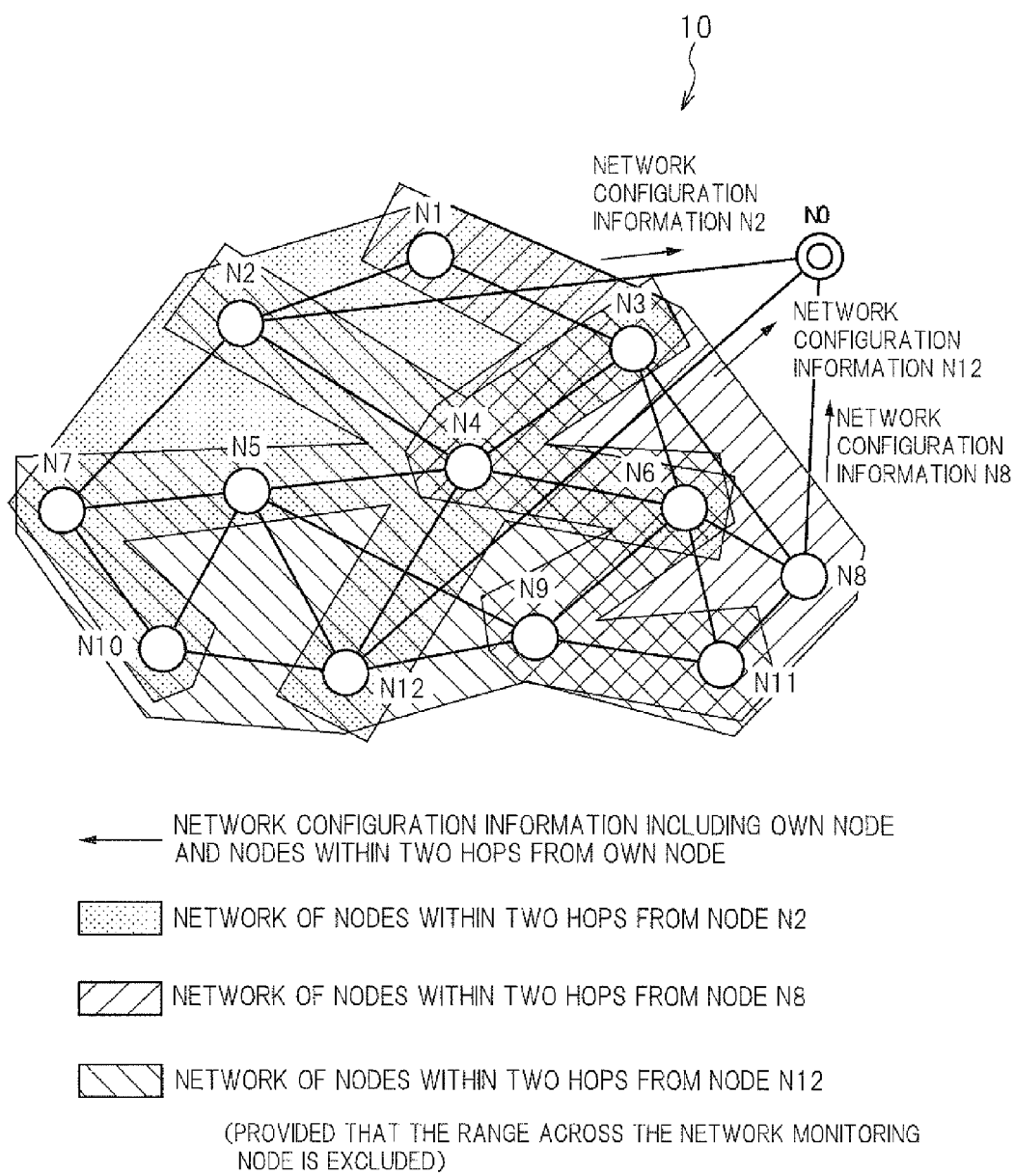

[ FIG.7 ]
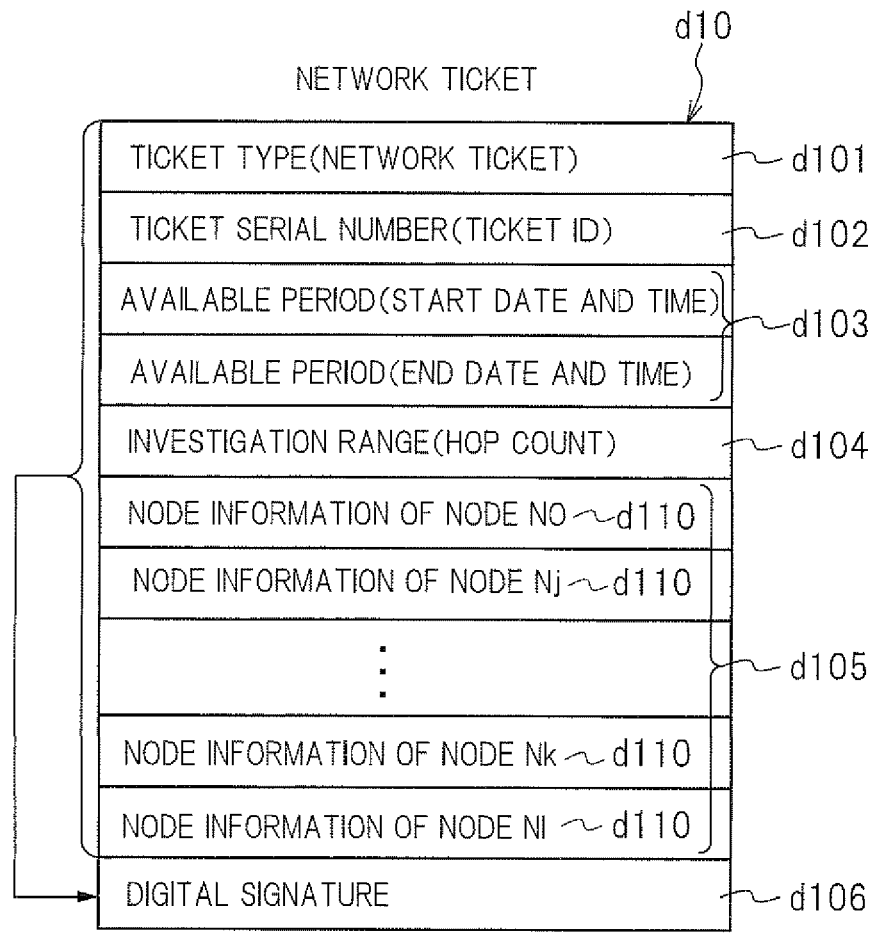
[ FIG.8 ]
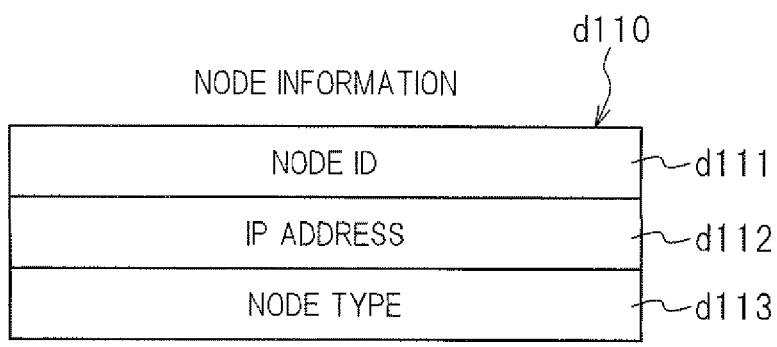

[ FIG.9 ]

NETWORK CONFIGURATION INFORMATION N1 d20
TRANSMITTED FROM NODE N1 TO N2

| TICKET ID | |
|---|---|
| 2 | NODE INFORMATION OF NODE N1 |
| ← | NODE ID OF NODE N2 |
| ⇔ | NODE ID OF NODE N3 |

[ FIG.10 ]

NETWORK CONFIGURATION INFORMATION N4 d20
TRANSMITTED FROM NODE N4 TO N2

| TICKET ID | |
|---|---|
| 5 | NODE INFORMATION OF NODE N4 |
| → | NODE ID OF NODE N2 |
| → | NODE ID OF NODE N3 |
| ← | NODE ID OF NODE N5 |
| ⇔ | NODE ID OF NODE N6 |
| ← | NODE ID OF NODE N12 |

[ FIG.11 ]

NETWORK CONFIGURATION INFORMATION N7 d20
TRANSMITTED FROM NODE N7 TO N2

| TICKET ID | |
|---|---|
| 3 | NODE INFORMATION OF NODE N7 |
| → | NODE ID OF NODE N2 |
| ⇔ | NODE ID OF NODE N5 |
| ← | NODE ID OF NODE N10 |

[ FIG.12 ]
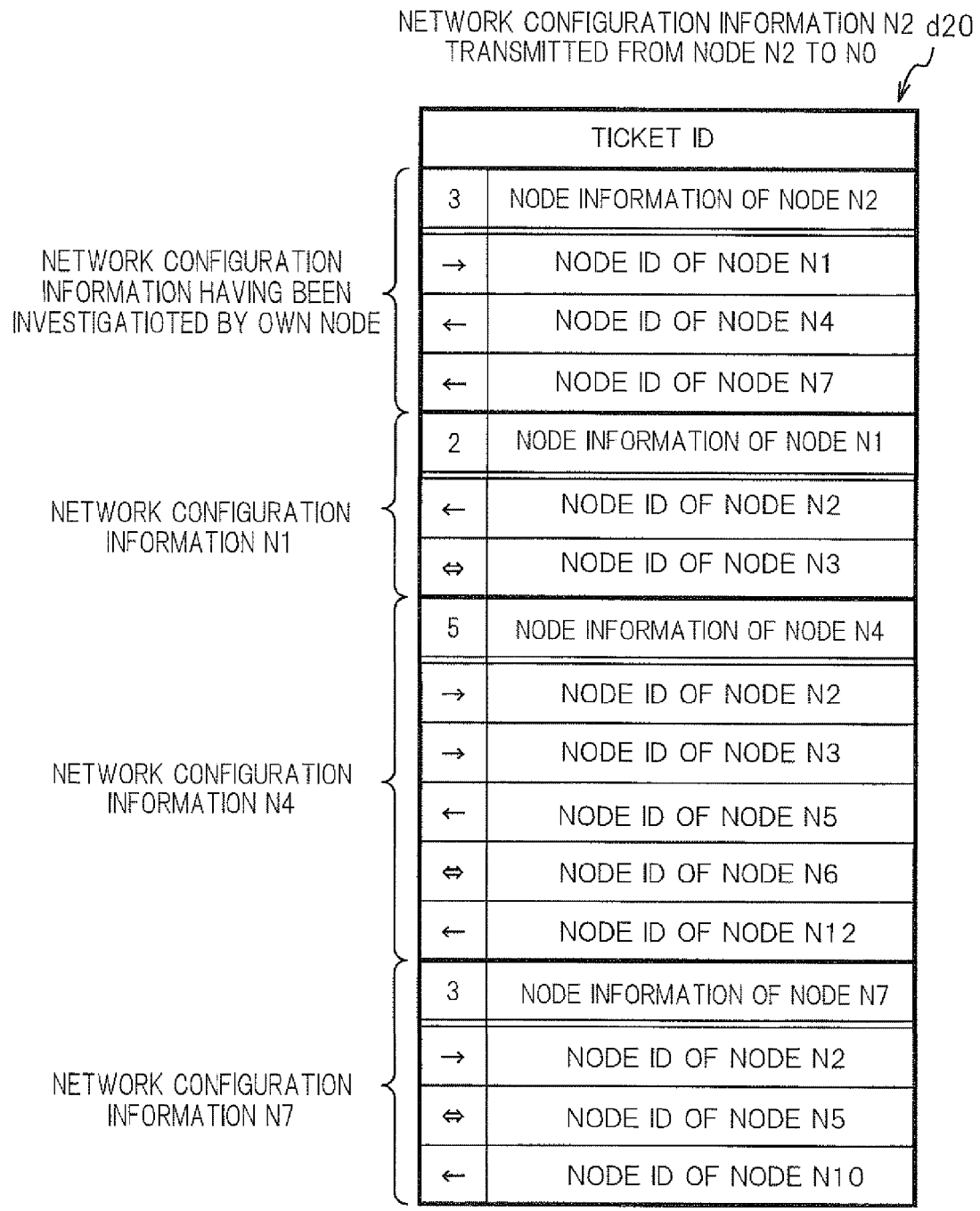

[ FIG.13 ]
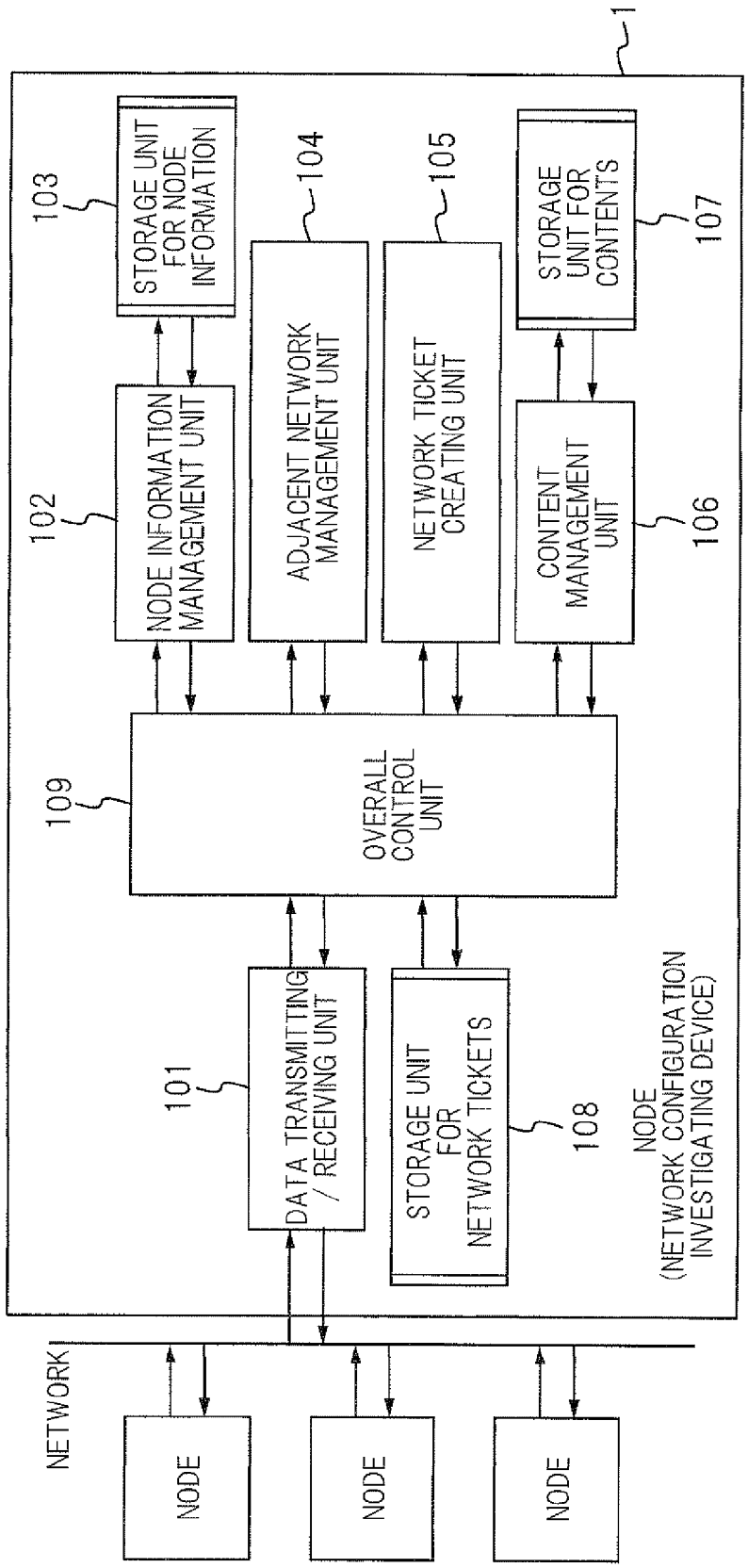

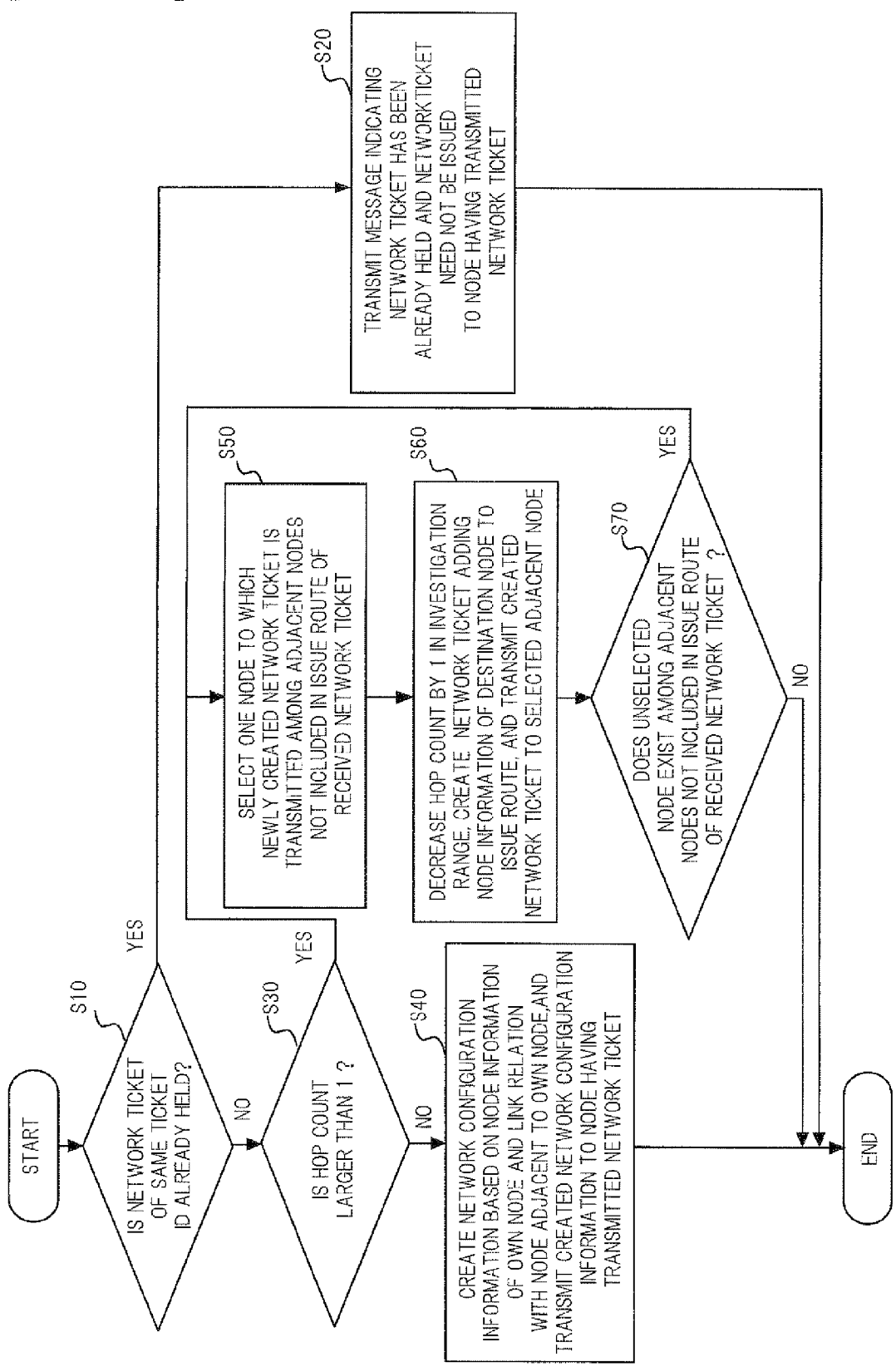
[ FIG.14 ]

[ FIG.15 ]
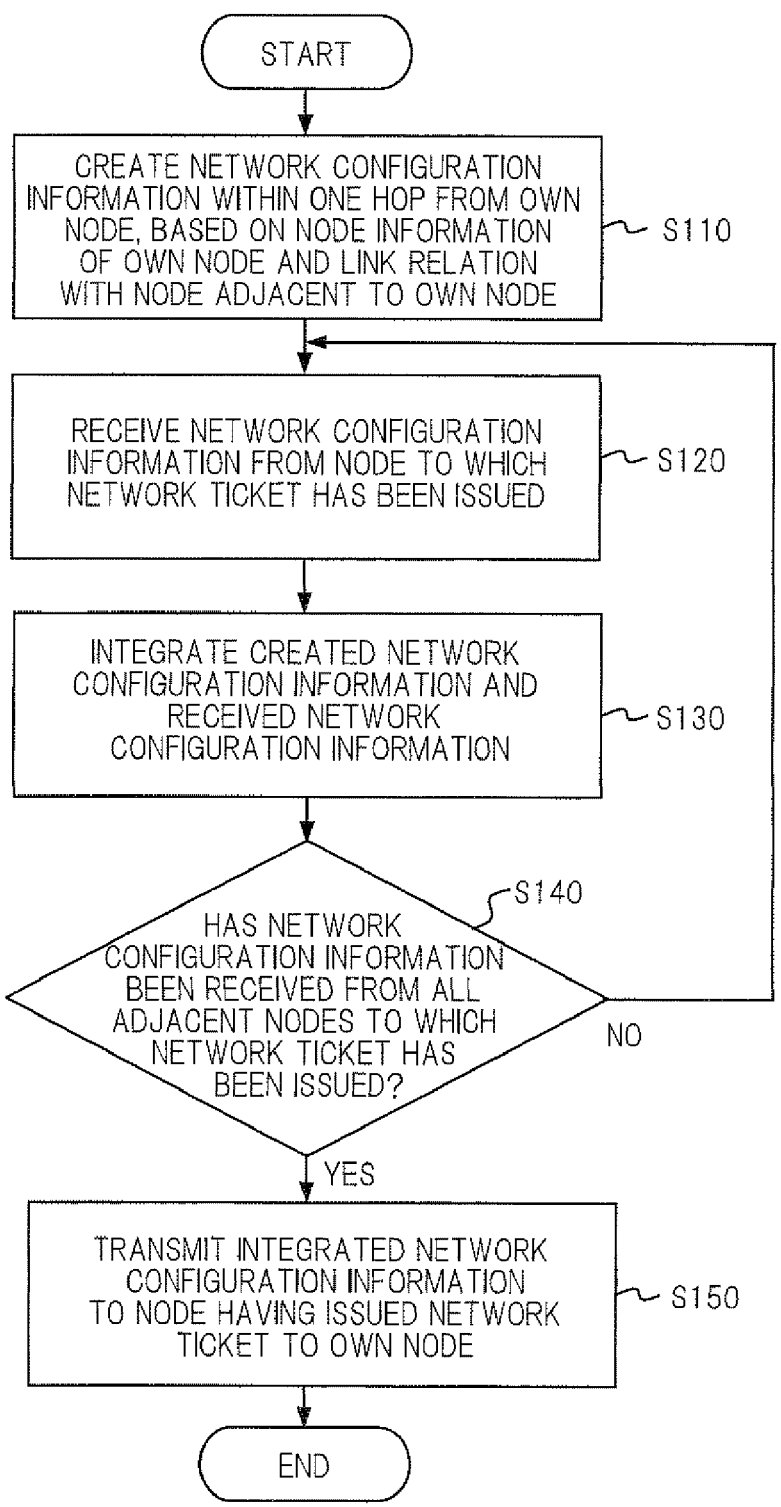

[ FIG.16 ]
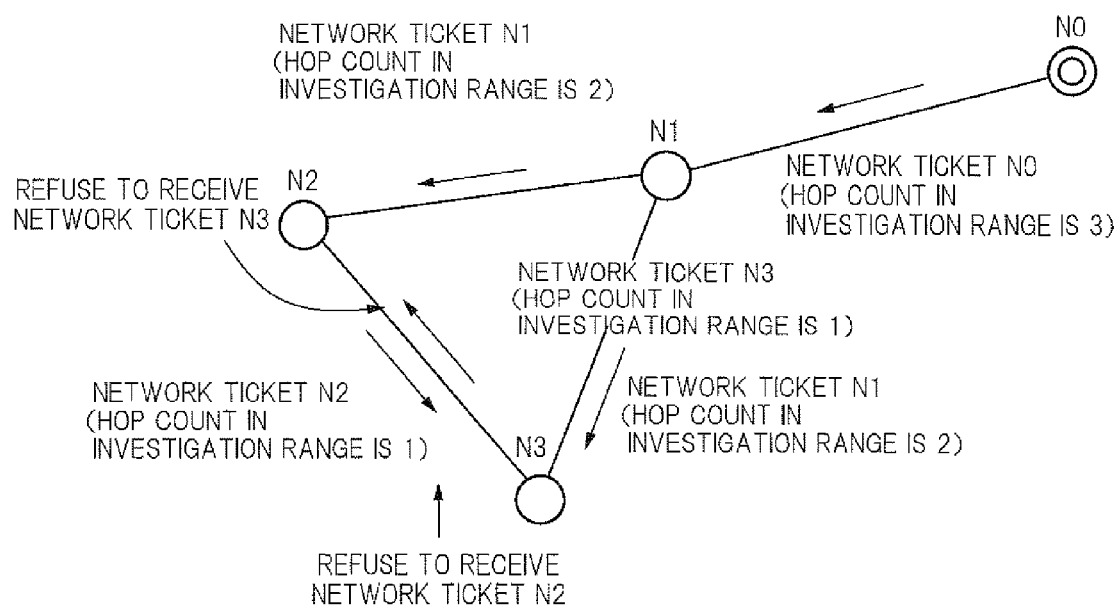

[ FIG.17 ]
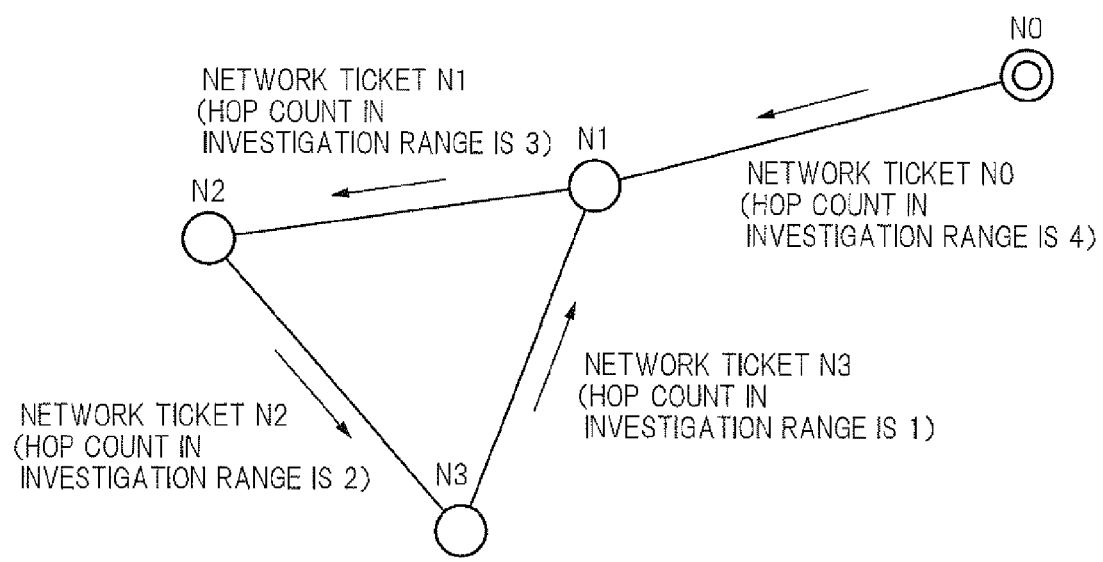

[ FIG.18 ]
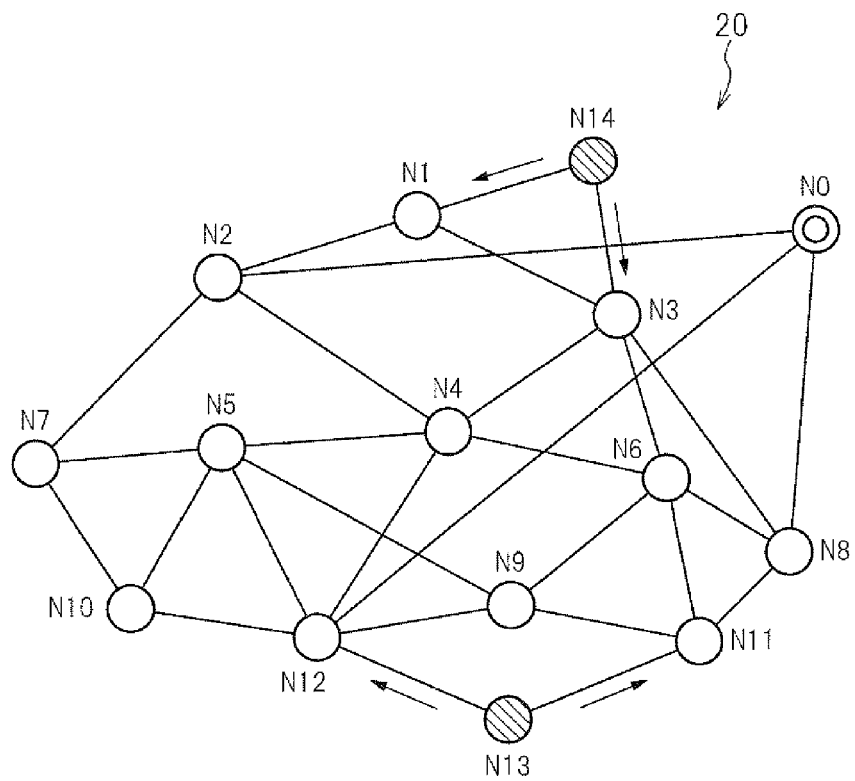
← INVESTIGATION REQUEST WHETHER NEW PARTICIPATING NODE IS WITHIN MONITORING AREA OF NETWORK CONFIGURATION MONITORING NODE
◎ NETWORK CONFIGURATION MONITORING NODE
⦰ NEW PARTICIPATING NODE

[ FIG.19 ]
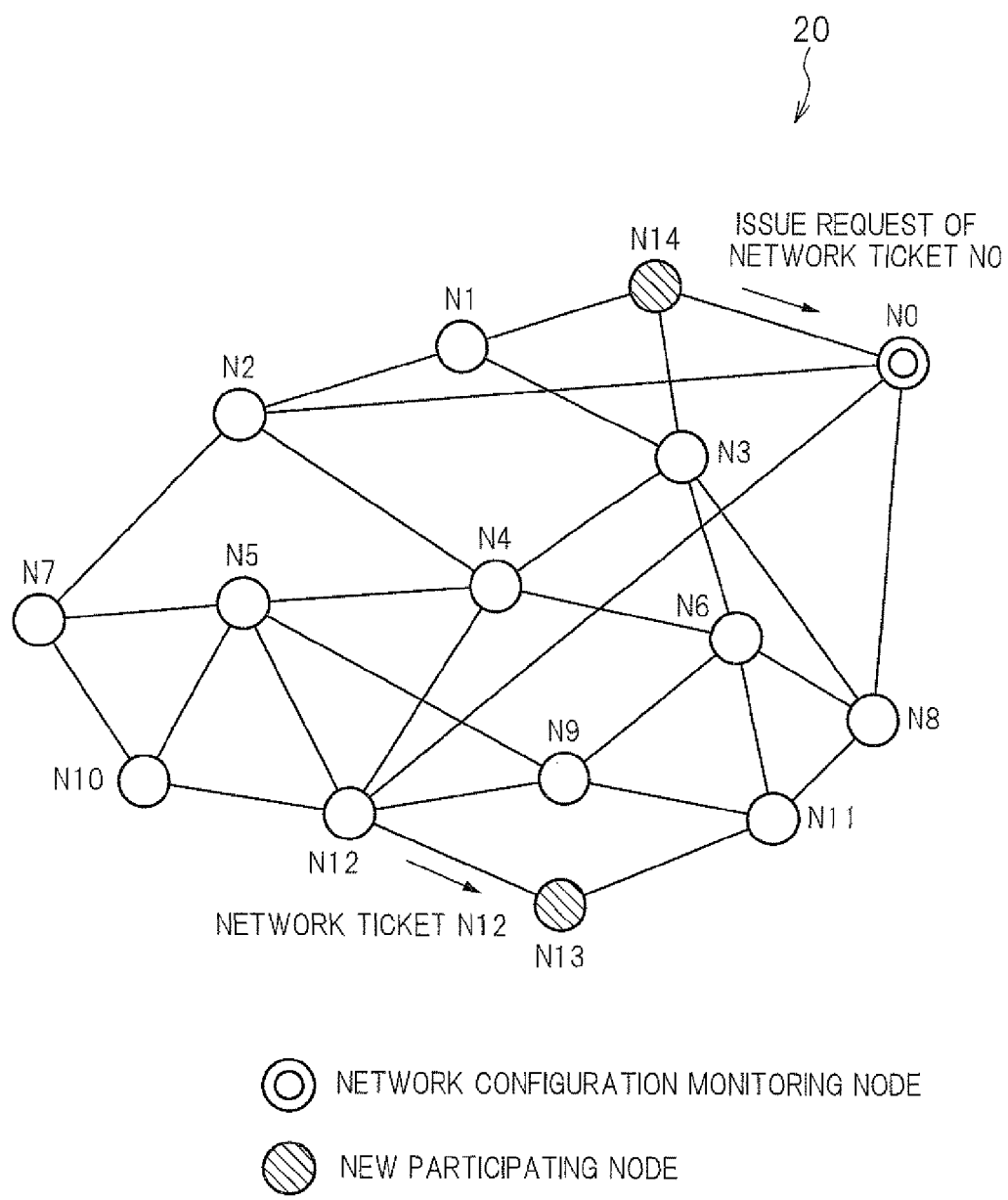

[ FIG.20 ]
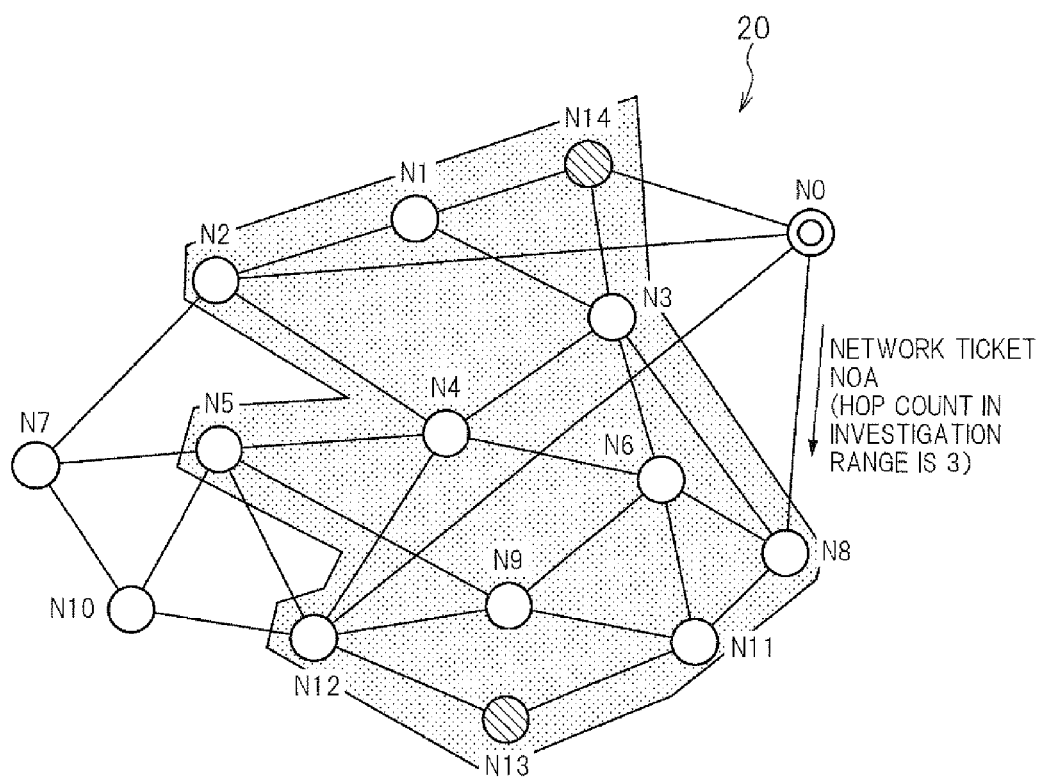
NETWORK TICKET NOA (HOP COUNT IN INVESTIGATION RANGE IS 3)
▒ MONITORING AREA OF NETWORK TICKET NOA REISSUED (PROVIDED THAT THE RANGE ACROSS THE NETWORK MONITORING NODE IS EXCLUDED)
◎ NETWORK CONFIGURATION MONITORING NODE
⊘ NEW PARTICIPATING NODE

[ FIG.21 ]
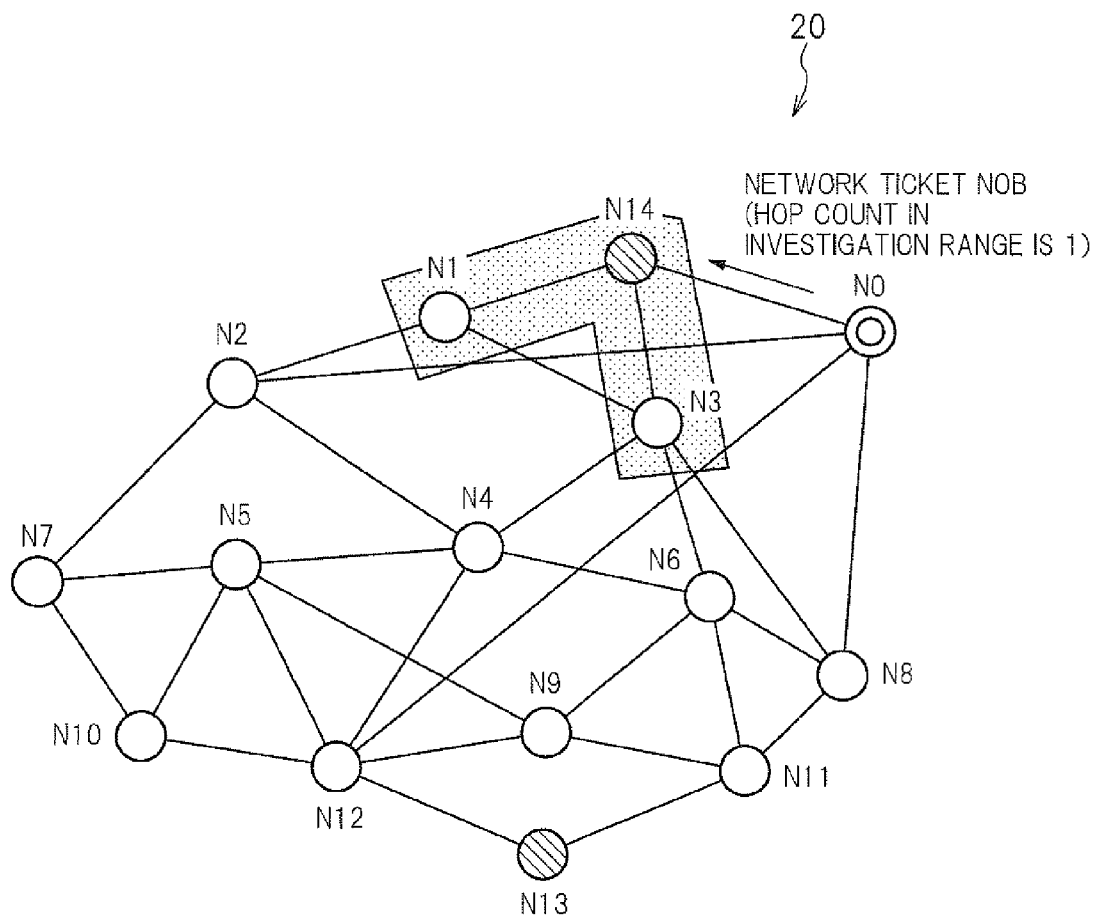

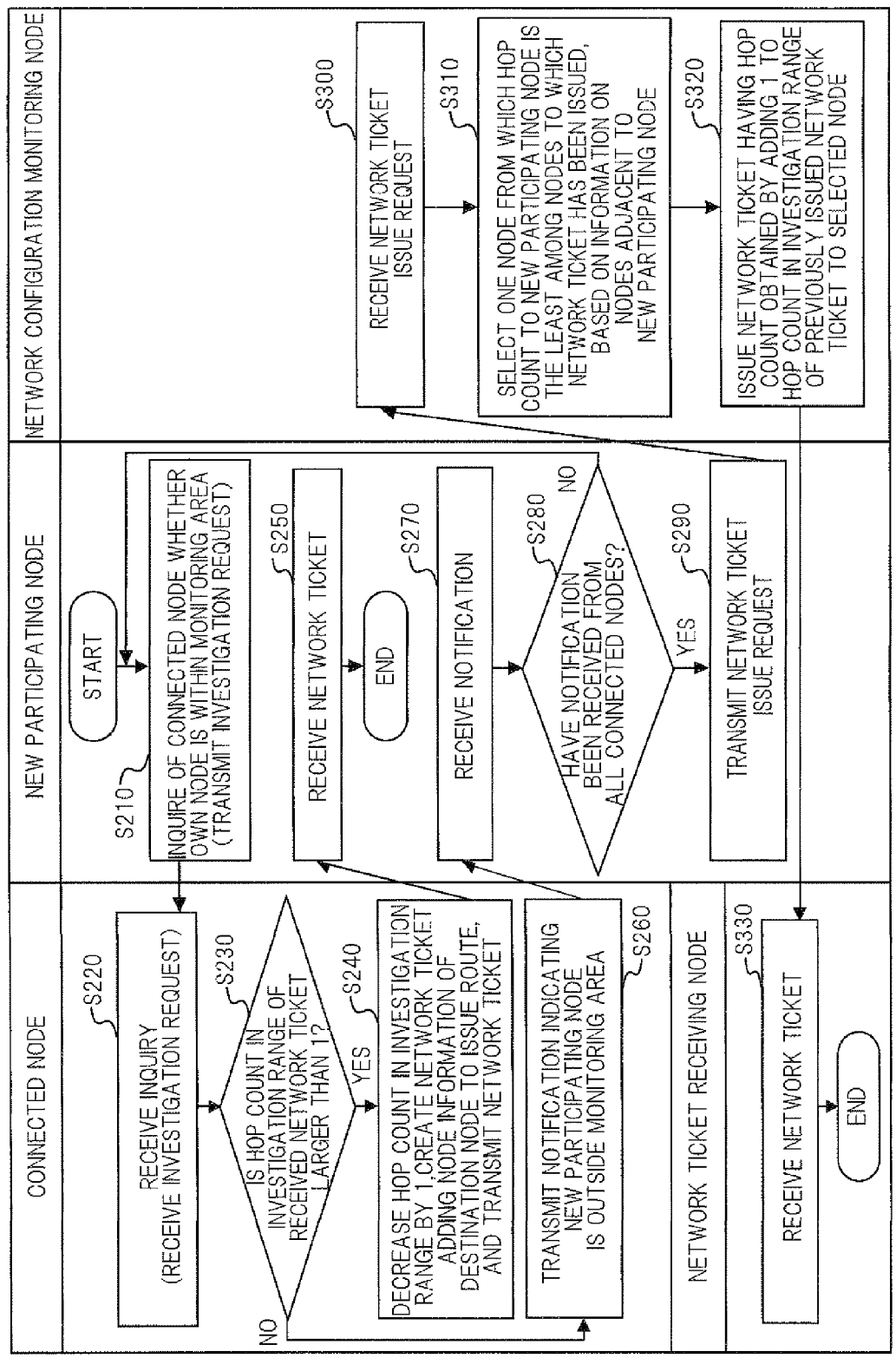
[FIG.22]

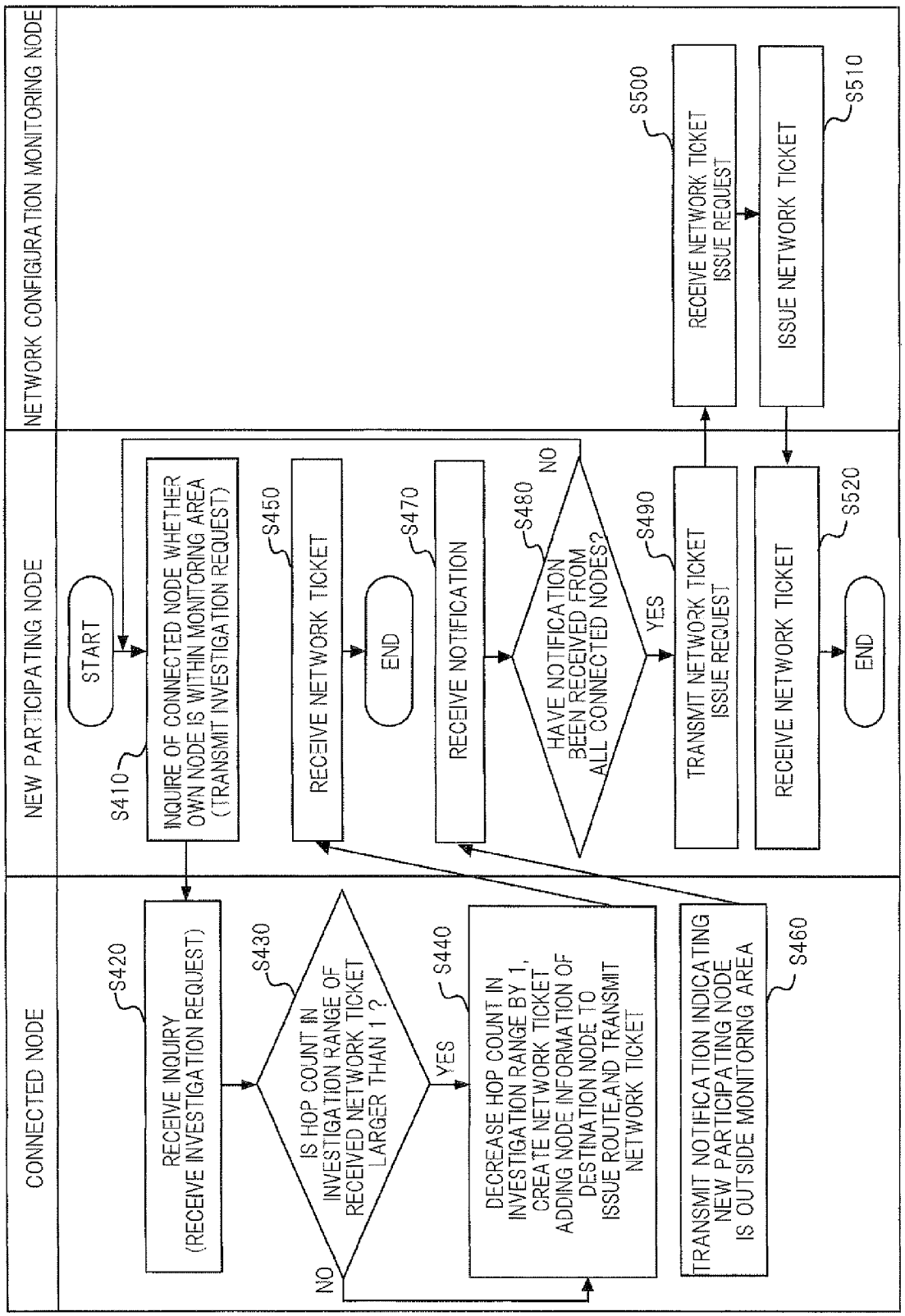
[ FIG.23 ]

ns by using information on nodes having been investigated by each
NETWORK CONFIGURATION INVESTIGATING DEVICE, NETWORK CONFIGURATION INVESTIGATING PROGRAM, NETWORK CONFIGURATION MANAGEMENT METHOD, AND NETWORK CONFIGURATION MANAGEMENT SYSTEM This application is the U.S. national phase of International Application No. PCT/JP2007/057162, filed 30 Mar. 2007, which designated the U.S, the entire contents of which is hereby incorporated by reference.

TECHNICAL FIELD OF THE INVENTION

The present invention relates to technologies for grasping network configurations in P2P (peer to peer) networks, and in particular, relates to network configuration investigating devices, network configuration investigating programs, network configuration management methods, and network configuration management systems.

BACKGROUND ART

FIG. 1 shows a network configuration of a P2P network 10 which is an example of P2P (Peer to Peer) networks. Each of N1 to N12 shown in FIG. 1 means a node in the P2P network 10, and lines connecting each node mean links between each node. For example, the node N4 is linked to the nodes N2, N3, N5, N6, and N12 to thereby be able to communicate with these nodes. In the P2P network 10, a target node to be linked is variable, and the P2P network 10 is, as a whole, a dynamic communication network which nodes can frequently participate in and pull out of.

As a method for grasping the network configuration of the P2P network 10, as shown in FIG. 2, there is a method that provides a network configuration monitoring node (a network management server) N0 to grasp the network configuration of the P2P network 10. In this case, the network configuration of the P2P network 10 is automatically changed according to power supply on-off of each node, user's tastes and preferences, and the like. Therefore, in order to enable the network configuration monitoring node N0 to grasp the network configuration of the P2P network 10, the network configuration monitoring node N0 need to provide direct links to each of the nodes N1 to N12 at all times, and at regular intervals receives information on adjacent nodes from each of the nodes linked thereto (e.g., see Patent Document 1).

Patent Document 1: Japanese Patent Laid-Open No. 2004-166081
Patent Document 2: Japanese Patent Laid-Open No. 2005-025315

DISCLOSURE OF THE INVENTION

Problems to be Solved by the Invention

However, in the above-mentioned method in which the network configuration monitoring node N0 is continuously linked to all nodes and collects information on adjacent nodes, when the number of connecting nodes increases so that the P2P network 10 expands, a load on the network configuration monitoring node N0 may increase.

The present invention has been made in order to solve the above-mentioned problems. An example of an object of the present invention is to provide network configuration investigating devices, network configuration investigating programs, network configuration management methods, and network configuration management systems, which are capable of: reducing, even if the P2P network is a large scale network, a load of a server managing a network configuration, and grasping the network configuration of the P2P network.

Means for Solving the Problems

In order to achieve the object provided above, a network configuration investigating device according to a first aspect of the invention is a network configuration investigating device constituting each node in a P2P network having a network monitoring node, the network monitoring node issuing a network ticket requesting to investigate nodes existing within a predetermined range from a node having received the network ticket, and managing a network configuration by using information on nodes having been investigated by each of nodes having received the network ticket, the network configuration investigating device comprising: a network ticket receiving means for receiving the network ticket from the network monitoring node or other node; a network configuration information acquiring means for investigating information on other nodes within range graspable by itself among the predetermined range, and acquiring a result of the investigation as network configuration information; a network ticket issuing means for, when investigating beyond the range graspable by itself, issuing a new network ticket to other nodes, and requesting the investigation based on the new network ticket; a network configuration information receiving means for receiving the network configuration information from the other nodes to which the new network ticket has been issued; and a network configuration information transmitting means for transmitting the network configuration information acquired by the network configuration information acquiring means and the network configuration information received by the network configuration information receiving means to the network monitoring node having transmitted the network ticket or the other node having transmitted the network ticket.

A network configuration investigating program according to a second aspect of the invention is a network configuration investigating program readable by each node in a P2P network having a network monitoring node, the network monitoring node issuing a network ticket requesting to investigate nodes existing within a predetermined range from a node having received the network ticket, and managing a network configuration by using information on nodes having been investigated by each of nodes having received the network ticket, the network configuration investigating program functioning the node as: a network ticket receiving means for receiving the network ticket from the network monitoring node or other node; a network configuration information acquiring means for investigating information on other nodes within range grasped by itself among the predetermined range, and acquiring a result of the investigation as network configuration information; a network ticket issuing means for, when investigating beyond the range grasped by itself, issuing a new network ticket to other nodes, and requesting the investigation based on the new network ticket; a network configuration information receiving means for receiving the network configuration information from the other nodes to which the new network ticket has been issued; and a network configuration information transmitting means for transmitting the network configuration information acquired by the network configuration information acquiring means and the network configuration information received by the network configuration information receiving means to the network monitoring node having transmitted the network ticket or the other node having transmitted the network ticket.

A network configuration management method according to a third aspect of the invention is a method for managing a network configuration in a network configuration management system comprising a plurality of nodes constituting a P2P network, and a network monitoring node managing a network configuration of the P2P network, the method comprising: issuing a network ticket to each of nodes adjacent to its own node, the network ticket requesting to investigate nodes existing within a predetermined range from a node having received the network ticket, in the network monitoring node; the network ticket comprising: a ticket ID which is given every one investigation of the network monitoring node, the ticket ID identifying a same investigation; and information on investigation range, the information in which the investigation range investigated by the node receiving this network ticket is described; receiving the network ticket from the network monitoring node or other node, in the node; referring to the information on the investigation range of the network ticket having been received, in the node; issuing, when the investigating range referred to is beyond the range graspable by itself, a new network ticket to each of other nodes adjacent to its own node, the new network ticket in which, same ticket ID as the ticket ID of the network ticket having been received, and the information on the investigation range about a destination node are recorded, and requesting the investigation based on the new network ticket, in the node; investigating the information on each of the nodes adjacent to its own node, and acquiring a result of the investigation as network configuration information associated with the ticket ID of the network ticket having been received, in the node; receiving the network configuration information from the other adjacent nodes to which the new network ticket has been issued, in the node; transmitting the acquired network configuration information and the received network configuration information to the network monitoring node having transmitted the network ticket or the other node having transmitted the network ticket, in the node; receiving the network configuration information from each of the nodes adjacent to its own node, in the network monitoring node; and grasping the whole network configuration of the P2P network, based on each of the network configuration information having been received, in the network monitoring node.

A network configuration management system according to a fourth aspect of the invention is a network configuration management system comprising a plurality of nodes constituting a P2P network, and a network monitoring node managing a network configuration of the P2P network wherein the network monitoring node comprises: a first network ticket issuing means for issuing a network ticket to each of nodes adjacent to its own node, the network ticket requesting to investigate nodes existing within a predetermined range from a node having received the network ticket; and a network configuration grasping means for receiving information on nodes from each of the nodes adjacent to its own node, the information which the adjacent nodes have investigated or other nodes have investigated, the other nodes of which the adjacent nodes has requested the investigation, and grasping the whole network configuration of the P2P network; the network ticket comprises: a ticket ID which is given every one investigation of the network monitoring node, the ticket ID identifying a same investigation; and information on investigation range of the network configuration, the information in which the investigation range being investigated by the node receiving the network ticket is described; the node comprises: a network ticket receiving means for receiving the network ticket from the network monitoring node or other node; a investigation referring means for referring to the information on the investigation range of the network ticket having been received; a network ticket issuing means for, when the investigating range referred to is beyond the range graspable by itself, issuing a new network ticket to each of other nodes adjacent to its own node, the new network ticket in which, same ticket ID as the ticket ID of the network ticket having been received, and the information on the investigation range about a destination node are recorded, and requesting the investigation based on the new network ticket; a network configuration information acquiring means for investigating the information on each of the nodes adjacent to its own node, and acquiring a result of the investigation as network configuration information associated with the ticket ID of the network ticket having been received; a network configuration information receiving means for receiving the network configuration information from the other adjacent nodes to which the new network ticket has been issued; and a network configuration information transmitting means for transmitting the network configuration information acquired by the network configuration information acquiring means and the network configuration information received by the network configuration information receiving means to the network monitoring node having transmitted the network ticket or the other node having transmitted the network ticket.

BRIEF DESCRIPTION OF THE DRAWINGS

FIG. 1 is a network configuration diagram of an example of a P2P network;

FIG. 2 is a network configuration diagram in the case of being provided a network configuration monitoring node in the P2P network shown in FIG. 1;

FIG. 3 is a view illustrating a network configuration management method according to an embodiment of the present invention;

FIG. 4 is a view illustrating a network configuration management method according to the embodiment of the present invention;

FIG. 5 is a view illustrating a network configuration management method according to the embodiment of the present invention;

FIG. 6 is a view illustrating network configuration management method according to the embodiment of the present invention;

FIG. 7 shows an example of a data format of a network ticket used in a network configuration management method according to the embodiment of the present invention;

FIG. 8 shows an example of a data format of node information used in a network configuration management method according to the embodiment of the present invention;

FIG. 9 shows an example of a data format of network configuration information used in a network configuration management method according to the embodiment of the present invention;

FIG. 10 shows an example of a data format of network configuration information used in a network configuration management method according to the embodiment of the present invention;

FIG. 11 shows an example of a data format of network configuration information used in a network configuration management method according to the embodiment of the present invention;

FIG. 12 shows an example of a data format of network configuration information used in a network configuration management method according to the embodiment of the present invention;

FIG. 13 is a schematic diagram of a network configuration investigating device according to the embodiment of the present invention;

FIG. 14 is a flowchart showing a network ticket receiving procedure to be executed by a network configuration investigating device according to the embodiment of the present invention;

FIG. 15 is a flowchart showing a network configuration information receiving procedure to be executed by a network configuration investigating device according to the embodiment of the present invention;

FIG. 16 is a view illustrating a case of denying reception of a network ticket in the network ticket receiving procedure shown in FIG. 14;

FIG. 17 is a view illustrating a case of stopping issue of a network ticket in the network ticket receiving procedure shown in FIG. 14;

FIG. 18 is a view illustrating a network configuration management method according to the embodiment of the present invention (when a new node participates in a P2P network);

FIG. 19 is a view illustrating a network configuration management method according to the embodiment of the present invention (when a new node participates in a P2P network);

FIG. 20 is a view illustrating a network configuration management method according to the embodiment of the present invention (when a new node participates in a P2P network);

FIG. 21 is a view illustrating a network configuration management method according to the embodiment of the present invention (when a new node participates in a P2P network);

FIG. 22 is a sequence diagram showing a network configuration management method 1 according to the embodiment of the present invention (when a new node participates in a P2P network); and FIG. 23 is a sequence diagram showing a network configuration management method 2 according to the embodiment of the present invention (when a new node participates in a P2P network).

DESCRIPTION OF SYMBOLS

1 Network configuration investigating device (Node)
10, 20 P2P network
101 Data transmitting/receiving unit
102 Node information management unit
103 Storage unit for node information
104 Adjacent network management unit
105 Network ticket creating unit
106 Content management unit
107 Storage unit for contents
108 Storage unit for network tickets
109 Overall control unit
N0 Network configuration monitoring node
N1, N2, . . . , N14 Node
d10 Network ticket
d20 Network configuration information
d102 Ticket ID
d104 Investigation range (hop count)
d105 Routing information
d110 Node information

BEST MODES FOR CARRYING OUT THE INVENTION

An embodiment of the present invention will be described hereinafter with reference to the drawings.

(Network Configuration Management Method)

A network configuration management method according to an embodiment of the present invention is not a method in which a network configuration monitoring node managing a network configuration in a P2P (Peer to Peer) network accesses all nodes in the P2P network, and collects information on nodes adjacent to each of all the nodes. The network configuration management method is a method in which:

at first, the network configuration monitoring node issues a network ticket to each of a predetermined number of nodes (the predetermined number of nodes<the number of all the nodes), next, the network tickets are sequentially propagated from a node to another node so as to cover all the nodes of the P2P network, next, each of the nodes having received the network ticket plays a role to investigate nodes adjacent to itself and creates information on a network configuration around itself, and finally, the network configuration monitoring node collects the information on the network configuration having been created by each of the nodes and grasps the configuration of the entire P2P network.

The network configuration management method according to the embodiment of the present invention will be described with reference to FIGS. 3 to 6. A communication network 10 shown in FIGS. 3 to 6 is an example of P2P networks. Each of N1 to N12 means a node in the P2P network 10, N0 means a network configuration monitoring node which manages the network configuration of the P2P network 10, and lines connecting each node mean links between the nodes. The link between nodes is ordinarily given after the nodes certificate each other at an initial connection. For example, because the node N4 provides links to the nodes N2, N3, N5, N6, and N12, it can communicate with these nodes.

In the P2P network 10, a node to be linked is variable, and the P2P network 10 is, as a whole, a dynamic communication network which nodes can frequently participate in and pull out of. The P2P network 10 to which the network configuration management method according to the embodiment of the present invention is applied does not depend on a kind or a type of the P2P network, and may be any P2P network.

Each node in the P2P network is a terminal device capable of transmitting and receiving data through a communication network such as an internet network. For example, each node is a computer such as a personal computer (PC) or a home information appliance such as a television, a DVD recorder, and an AV server.

At first, as shown in FIG. 3, the network configuration monitoring node N0 provides links each of the nodes N2, N8 and N12, and transmits a network ticket N0 to each of the nodes N2, N8 and N12.

Here, network tickets are network investigation requests from the network configuration monitoring node N0 to other nodes. Receiving a network ticket by a certain node means that a network configuration monitoring function has been transferred from the network configuration monitoring node N0 to the certain node. For example, in the FIG. 3, each of the nodes N2, N8 and N12 to which the network configuration monitoring function has been transferred from the network configuration monitoring node N0 investigates a network configuration around itself. In the embodiment, the description of the network ticket N0 means the network ticket which the node N0 has issued. For example, the network ticket which the node N2 has issued is referred to as the network ticket N2.

In a network ticket, an investigation range is described. Specifically, when a certain node has received a network ticket, in the network ticket, the investigation range of the certain node is described as a hop count from the certain node. For example, the certain node having received the network ticket with an investigation range in which 2 has been described investigates the network configuration including nodes within two hops around the certain node.

Note that "hop count" means the number of at least one node that has been passed by a movement from a node as a start point to an alternative node as an end point in the P2P network. Since the hop count described in the investigation range of the network ticket N0 shown in FIG. 3 is 2, the node N2 having received the ticket N0 investigates the network configuration about the nodes within two hops from the node N2.

Each of the nodes N2, N8, and N12 having received the network ticket N0 investigates the nodes within two hops from itself. Because each of the nodes N2, N8, and N12 can investigate, by itself, nodes one hop ahead from itself but cannot investigate, by itself, nodes two hops ahead from itself, each of the nodes N2, N8, and N12 requests nodes adjacent thereto to carry out an investigation. For example, the node N2, as shown in FIG. 4, issues the network ticket N2 (the hop count described in the investigation range is 1) to each of the nodes N1, N4, and N7, the network ticket N2 for investigating the nodes adjacent to each of the nodes N1, N4, and N7.

Each of the nodes N1, N4, and N7, having received the network ticket N2 issued by the node N2, investigates the nodes one hop ahead from itself, that is, the nodes adjacent to itself, and transmit a result of the investigation (network configuration information) to the node N2. In the embodiment, the description of the network configuration information N1 means the network configuration information created by the node N1 and transmitted to an originator of the network ticket. For example, the network configuration information created by the node N4 and transmitted to an originator of the network ticket is referred to as the network configuration information N4.

FIG. 5 shows the network within one hop from the nodes N1, N4, and N7 in a hatched area. That is, the information on the nodes in the hatched area is transmitted to the node N2. As a result, the node N2 collects the information on the node within two hops from itself; this information includes the information on the nodes which the node N2 has investigated by itself. This makes it possible to create the network configuration information N2 within two hops from the node N2.

The node N2 having created the network configuration information N2 transmits the network configuration information N2 to the network configuration monitoring node N0 that is the originator of the network ticket N0. Thus, the network configuration monitoring node N0 can grasp the network configuration within two hops from the node N2. Similarly, the network configuration monitoring node N0 receives the network configuration information N8 and the network configuration information N12 from the nodes N8 and N12, respectively, thus being able to grasp the network configuration within two hops from each of the nodes N8 and N12.

FIG. 6 shows network areas included in respective pieces of the network configuration information N2, N8, and N12. As shown in FIG. 6, the combination of the pieces of the network configuration information N2, N8, and N12 covers the entire P2P network 10 so that the network configuration monitoring node N0 can grasp the network configuration of the entire P2P network 10.

In the examples shown in FIGS. 3 to 6, the hop count of 2 has been described in the investigation range of the network ticket N0. When the number of nodes increases and the P2P network 10 has a larger scale, the entire P2P network 10 can be covered by increasing the hop count or the number of nodes to which the network ticket N0 is transmitted (the number of issues of the network ticket N0).

As mentioned above, the P2P network 10 is a dynamic communication network so that the network configuration monitoring node N0 issues the network ticket N0 to a predetermined number of nodes at regular intervals. Thus, even for a dynamic communication network as a target, the network configuration management method can accurately grasp the network configuration.

Note that, in the examples shown in FIGS. 3 to 6, values of the investigation ranges of the network tickets N0 for the respective nodes N2, N8, and N12 are identical to each other, but can be different from each other.

(Configuration of Data)

Next, data which is communicated in the P2P network 10 will be described in the network configuration management method according to the embodiment of the present invention.

FIG. 7 shows an example of a data format of the network ticket d10 (when described as data, unused to identify the originator of the ticket like the above-mentioned network tickets N0, N2, it is referred to as the network ticket d10). The network ticket d10 according to the embodiment is, as shown in FIG. 7, composed of a ticket type d101, a ticket serial number (ticket ID) d102, an available period (a start date and time, end date and time) d103, an investigation range (hop count) d104, routing information (node information) d105, and a digital signature d106.

The ticket type d101 is flag information indicating the kind of the ticket. In the embodiment, the flag information indicating that the network ticket d10 investigates the network configuration is described in the ticket type d101.

The ticket serial number d102 is a ticket ID that can uniquely identify the network ticket d10. In the embodiment, whenever one investigation of the network configuration is executed, one ticket ID is adapted to be issued. In other words, the ticket ID is generated by the network configuration monitoring node N0. Thus, while the network ticket d10 for the same investigation is propagated in the P2P network 10, each node does not generate the ticket ID when issuing the network ticket d10 (the ticket IDs of the network tickets N0 and N2 shown in FIGS. 3 and 4 are the same as each other).

The available period d103 is an available period of the network ticket d10. The start date and time, and the end date and time therein are appointed by the network configuration monitoring node N0. That is, authority to investigate the network configuration is given to the node having the network ticket d10 only during this available period.

The investigation range d104 is an investigation range when the network configuration is investigated. When a certain node has received the network ticket d10, the investigation range in the network ticket d10 is described as the hop count from the certain node. For example, the certain node having received the network ticket with the investigation range in which 2 is described investigates the network configuration including the node within two hops from the certain node. Enlarging this value allows the network in the large area to be investigated. For this reason, the network configuration of the whole P2P network 10 can be grasped without increasing the number of nodes that the network configuration monitoring node N0 connects even when the P2P network 10 becomes large-scale.

In other words, the network configuration management method according to the embodiment of the present invention can grasp the configuration of the whole P2P network 10 without increasing the load of the network configuration monitoring node N0 even if the P2P network 10 becomes large-scale. In addition, the hop count set in the investigation range d104 is determined by adding an operation control function such as a CPU of the network configuration monitoring node N0 (for example, when the network configuration monitoring node N0 has a high performance operation control function, the network configuration monitoring node N0 may increase the number of issues of the network ticket N0 and decrease the hop count).

In the routing information (node information) d105, an issue route of the network tickets d10 with the same ticket ID is described. The node information d110 is described one by one whenever originator nodes and destination nodes issue the network ticket d10. For example, when the network ticket N0 has been issued in the order of the network configuration monitoring node N0, the node N2, and the node N1, in the routing information of the network ticket d10 issued by the network configuration monitoring node N0 to the node N2, the node information d110 of the node N0 as the originator node and the node N2 as the destination node are described. Next, in the routing information of the network ticket d10 issued by the node N2 to the node N1, the node information d110 of the node N1 as the destination node is described in addition to the aforementioned node information.

FIG. 8 shows an example of a data format of the node information d110. The node information d110 consists of a node ID d111 for uniquely identifying the node in the P2P network 10, an IP address d112 for indicating location information of the node, and a node type d113 for indicating the type of the node (for example, the PC etc).

The digital signature d106 is set for prevention of manipulation of the network ticket d10. A node having received the network ticket d10, at first, verifies the validity of the digital signature, and next, only when confirms no manipulation, investigates the network configuration.

Next, a data format of the network configuration information d20 (when described as data, unused to identify an originator of the network configuration information like the pieces of the above-mentioned network configuration information N1, N2, it is referred to as the network configuration information d20) according to the embodiment of the present invention will be described.

The network configuration information d20 to be created by a node not issuing the network ticket d10 (a node having received the network ticket d10 with the hop count being 1) is composed of:

the ticket ID d102 of the network ticket d10 having been received as an investigation request;

the number of links of the node itself (the number of nodes adjacent to the node itself);

the node information d110 of the node itself;

the node ID d110 of each of the nodes adjacent to the node itself; and directions of the links, Note that, since some types of the P2P network, such as Winny, has directed connections of links, such as uplinks, down links, and the like, the directions of the links are set to correspond to the directed connections of links.

For example, the network configuration information N1 shown in FIG. 5, as shown in FIG. 9, is composed of the ticket ID, the number (2) of links of the node N1, the node information of the node N1, the node ID of the node N2, the direction of the link between the node N1 and the node N2 (←), the node ID of the node N3, and the direction of the link between the node N1 and the node N3 ((↔)).

The network configuration information N4 shown in FIG. 5, as shown in FIG. 10, is also composed of the ticket ID, the number (5) of links of the node N4, the node information of the node N4, the node ID of the node N2, the direction of the link between the node N4 and the node N2 (→), the node ID of the node. N3, the direction of the link between the node N4 and the node N3 (→), the node ID of the node N5, the direction of the link between the node N4 and the node N5 (←), the node ID of the node N6, the direction of the link between the node N4 and the node N6 ((↔)), the node ID of the node N12, and the direction of the link between the node N4 and the node N12 (←).

Furthermore, the network configuration information N7 shown in FIG. 5, as shown in FIG. 11, is composed of the ticket ID, the number (3) of links of the node N7, the node information of the node N7, the node ID of the node N2, the direction of the link between the node N7 and the node N2 (→), the node ID of the node N5, the direction of the link between the node N7 and the node N5 ((↔)), the node ID of the node N10, and the direction of the link between the node N7 and the node N10.

On the other hand, the network configuration information d20 to be created by a node issuing the network ticket d10 (a node having received the network ticket d10 with the hop count being greater than 1) is composed of:

the ticket ID d102 of the network ticket d10 having been received as the investigation request, the number of links of the node itself (the number of nodes adjacent to the node itself);

the node information d110 of the node itself;

information consisting of the node ID d111 of each of the nodes adjacent to the node itself and directions of the links (hereafter, above-mentioned information is referred to as its own investigated network configuration information); and the network configuration information having been investigated by another node based on the network ticket d10 which issued by the node.

For example, the network configuration information N2 shown in FIG. 6, as shown in FIG. 12, is composed of the network configuration information N1 transmitted from the node N1, the network configuration information N4 transmitted from the node N4, and the network configuration information N7 transmitted from the node N7 besides the ticket ID, and its own investigated network configuration information.

<Configuration of Network Configuration Investigating Device>

Next, a configuration of each node in the P2P network 10 will be described. Each node is a network configuration investigating device investigating the information on nodes around itself. That is, each node is designed to have a network configuration investigating function in the network configuration investigating method according to the embodiment.

FIG. 13 is a schematic diagram of the network configuration investigating device 1 (when described as the device having functions that are common to the nodes N1 to N12, the device is referred to as the network configuration investigating device 1) according to the embodiment of the present invention. The network configuration investigating device 1 is configured by including a data transmitting/receiving unit 101, a node information management unit 102, a storage unit 103 for node information, an adjacent network management unit 104, a network ticket creating unit 105, a content management unit 106, a storage unit 107 for contents, a storage unit 108 for network tickets, and an overall control unit 109.

The data transmitting/receiving unit 101 transmits/receives data to/from the network configuration monitoring node N0 or other nodes. Specifically, the data transmitting/receiving unit 101 transmits/receives content data, the network ticket d10, the network configuration information d20, and the like, to/from the network configuration monitoring node N0 or other nodes.

The node information management unit 102 manages the node information d110 including the node information on destination nodes (nodes linked thereto), and the node information on itself, and the like. The node information d110 is used when a corresponding node participates in the P2P network 10.

The storage unit 103 for node information is a storage storing therein the node information d110 that the node Information management unit 102 manages.

The adjacent network management unit 104 investigates information (network configuration) on nodes adjacent to its own node based on the network ticket d10 issued by an adjacent node.

The network ticket creating unit 105 creates the network ticket d10, and issues the created network ticket d10 to nodes adjacent to its own node for investigating the network configuration.

The content management unit 106 manages contents (for example, contents downloaded through the P2P network 10 and the like) used in the network configuration investigating device 1.

The storage unit 107 for contents stores therein contents that the content management unit 106 manages.

The storage unit 108 for network tickets stores therein the network ticket d10 received by its own node, and the network ticket d10 issued by its own node.

The overall control unit 109 controls the operations of each of the units 101 to 108.

Note that the network configuration investigating node 1 is designed to be as an electronic device at least provided with: a central processing unit (CPU) having calculation and control functions; a main memory, such as a ROM, RAM, and the like, having a function to store programs and data; and an auxiliary memory, such as a hard disk. The data transmitting/receiving unit 101, the node information management unit 102, the adjacent network management unit 104, the network ticket creating unit 105, the content management unit 106, and the overall control unit 109 specifically represent the calculation and control functions by the CPU. The storage unit 103 for node information, the storage unit 107 for contents, and the storage unit 108 for network tickets specifically represent the functions of the main memory and the auxiliary memory.

A program executing each of procedures of the network configuration investigating device 1, for example, a network ticket receiving procedure, a network configuration receiving procedure, and a procedure when it is participated in the P2P network as described below, is stored in the above-mentioned main memory. This program can be recorded on a computer-readable recording medium, such as a hard disk, a flexible disk, a CD-ROM, a DVD-ROM, and the like, and can be delivered through a communication network.

(Operations of Network Configuration Investigating Device)

Next, the operations of the network configuration investigating device 1 according to the embodiment of the present invention will be described with reference to FIGS. 14 and 15. FIG. 14 is a flowchart showing the network ticket receiving procedure to be executed by the network configuration investigating device 1 when the network configuration investigating device 1 has received the network ticket d10 from the network configuration monitoring node or another node. FIG. 15 is a flowchart showing the network configuration information receiving procedure to be executed by the network configuration investigating device 1 when the network configuration investigating device 1 has received the network configuration information d20 from another node.

(Network Ticket Receiving Procedure)

The network ticket receiving procedure will be described with reference to FIG. 14, In response to receiving the network ticket d10, the network configuration investigating device 1 determines whether a network ticket with a ticket ID identical to that of the network ticket d10 is stored therein (step S10). There is a possibility that one node holds a plurality of network tickets of a same ticket ID by the differences among their routes to be passed. In consideration of the possibility, in order to avoid a double network investigation, the operation in S10 is executed.

For example, as shown in FIG. 16, in a case where the network configuration monitoring node N0 issues the network ticket N0 having the investigation range d104 to the hop count of 3 is set, when the route is looped, the node N2 can receive both:

the network ticket N1 transmitted by way of one route (the network configuration monitoring node N0→the node N1→the node N2);

and the network ticket N3 transmitted by way of the other route (the network configuration monitoring node N0→the node N1→the node N3→the node N2). When the node N2 has already received the network ticket N1, the node N2 refuses to receive the network ticket N3 which will be received later (or abandon the network ticket N3 having been received). Thus, wasted network investigations are designed to be omitted.

When holding a network ticket with the ticket ID identical to that of the network ticket d10 (step S10: YES), the network configuration investigating device 1 transmits a message to the node having transmitted the network ticket d10; the message indicates that the network ticket with the ticket ID identical to that of the network ticket d10 has been already held so that the network ticket d10 need not be issued (step S20).

When not holding a network ticket with the ticket ID identical to that of the network ticket d10 (step S10: NO), the network configuration investigating device 1 refers to the hop count in the investigation range d104 of the network ticket d10, and determines whether the hop count is larger than 1 (step S30).

When the hop count is not larger than 1 (step S30: NO), that is, the hop count is 1, the network configuration investigating device 1 need not to issue the network ticket d10. Accordingly, the network configuration investigating device 1 investigates information on its own node (the number of links, the node information) and information on nodes adjacent to its own node (the node information, the link relation), creates the network configuration information d20, and transmits the created network configuration information d20 to the node having issued the network ticket d10 (step S40).

On the other hand, when the hop count is larger than 1 (step S30: YES), the network configuration investigating device 1 need to issue the network ticket d10 to the adjacent nodes. Accordingly, the network configuration investigating device 1 selects one node from the adjacent nodes as a destination node to which the network ticket d10 is to be transmitted (step S50).

Note that, in selecting an adjacent node, it is necessary to select an adjacent node not included in the routing information d105 of the received network ticket d10. This is to refrain from issuing the network ticket d10 in a case where the destination node of the network ticket d10 is included in the routing information d105 so that the destination node has already held the network ticket d10 of the same ticket ID.

For example, as shown in FIG. 17, in a case where the network configuration monitoring node N0 issues the network ticket N0 having the investigation range d104 to which to which the hop count of 4 is set, when the route is looped, the node N3 receives the network ticket N2 transmitted by way of one route (the network configuration monitoring node N0→the node N1→the node N2→the node N3). In addition, when further trying to issue the network ticket N3 to the node N1, because the node N1 has already held the network ticket d10 of the same ticket ID (it is determined by the routing information d105), the node N3 refrains from issuing the network ticket d10 to the node N1. Thus, wasted network investigations are designed to be omitted.

Next, the network configuration investigating device 1 decreases the hop count by 1 in the investigation range d104, creates the network ticket d10 adding the node information d110 of the destination node to the routing information d105, and transmits the created network ticket d10 to the selected adjacent node (step S60).

Next, the network configuration investigating device 1 determines whether an unselected node exists among the adjacent nodes not included in the routing information d105 of the received network ticket d110 (step S70). When the unselected node exists (step S70: YES), the network configuration investigation device 1 returns to step S50, and selects another one adjacent node again. When no unselected nodes exist (step S70: NO), the network configuration investigating device 1 terminates the network ticket receiving procedure.

(Network Configuration Information Receiving Procedure)

The network configuration information receiving procedure will be described with reference to FIG. 15.

At first, the network configuration investigating device 1 investigates the information on its own node (the number of links, the node information) and the information on nodes adjacent to its own node (the node information, the link relation), and creates the network configuration information d20 (step S110).

Next, the network configuration investigating device 1 receives the network configuration information d20 from an adjacent node to which its own node has issued the network ticket d10 (step S120). The network configuration investigating device 1 integrates the network configuration information d20 which its own node has created and the network configuration information d20 which has been received, based on the same ticket ID, and creates integrated network configuration information d20 (step S130).

Next, the network configuration investigating device 1 determines whether the network configuration information d20 has been received from all the adjacent nodes to which the network ticket d10 has been issued (step S140). When the network configuration information d20 has been received from all the adjacent nodes (step S140: YES), the network configuration investigating device 1 transmits the integrated network configuration information d20 to the originator node having issued the network ticket d10 that its own node has received (step S150). When the network configuration information d20 has been not received from at least one of the adjacent nodes (step S140: NO), the network configuration investigating device 1 returns to step S120, and receives the network configuration information d20 from one of the adjacent nodes to which its own node has issued the network ticket d10.

Note that, in the embodiment, the network configuration investigating device 1 integrates the network configuration information d20 which its own node has created and the network configuration information d20 which has been received, based on the same ticket ID, and transmits the integrated network configuration information d20 to the originator node which has issued the network ticket d10. However, the network configuration investigating device 1 may transmit each network configuration information d20 to the originator node which has issued the network ticket d10, without integrating each network configuration information d20. In this case, the network configuration monitoring node N0 finally integrates pieces of the network configuration information d20.

(Procedure when a Node has Participated in the P2P Network)

Next, the network configuration management method will be described when a new node has participated in the P2P network 10.

FIG. 18 shows the network configuration of a P2P network 20 when nodes N13 and N14 have participated in the P2P network 20. In this case, the node N13 transmits an investigation request to each of the adjacent nodes N11 and N12; the investigation request inquires whether its own node is within a monitoring area of the network configuration monitoring node N0. Similarly, the node N14 transmits this investigation request to each of the adjacent nodes N1 and N3.

Each of the adjacent nodes having received the investigation request refers to the investigation range d104 of the network ticket d10 which its own node has received, and determines whether the hop count is larger than 1. When the hop count is larger than 1, each of the adjacent nodes having received the investigation request can issue the network ticket d10 to a corresponding one of new participating nodes, thus transmitting the network ticket d10 as a message to the corresponding one of new participating nodes having transmitted the investigation request; the message indicates that the corresponding one of new participating nodes is within the monitoring area of the network configuration monitoring node N0.

For example, in the P2P network 20 shown in FIG. 19, when the network configuration monitoring node N0 has issued, to each of the nodes N2, N8, and N12, the network ticket d10 with the investigation range d104 in which the hop count of 2 is set, the node N13 receives the network ticket N12 from the node N12 to thereby grasp that it is within the monitoring area of the network configuration monitoring node N0.

On the other hand, when the hop count is 1, the adjacent nodes having received the investigation request cannot issue the network ticket d10 to a corresponding one of new participating nodes, thus transmitting a message to the corresponding one of new participating nodes; this message indicates that the corresponding one of new participating nodes is not within the monitoring area of the network configuration monitoring node N0.

For example, in the P2P network 20 shown in FIG. 19, when the network configuration monitoring node N0 has issued the network ticket d10 to each of the nodes N2, N8, and N12, the network ticket d10 with the investigation range d104 in which the hop count of 2 is set, the node N14 receives the message indicating the node N14 is not within the monitoring area of the network configuration monitoring node N0 from each of the nodes N1 and N3 to thereby grasp that it is outside the monitoring area of the network configuration monitoring node N0.

In this case, the node N14 transmits a network ticket issue request d30 to the network configuration monitoring node N0; this network ticket issue request d30 requests that a new network ticket will be transmitted to its own node. Here, the network ticket issue request d30 is at least composed of flag information indicating the network ticket issue request, and information (the node ID, the link relation) on nodes adjacent to a new participating node. Specifically, the node N14 transmits, to the network configuration monitoring node N0, the flag information indicating the network ticket issue request and the information on the nodes N1 and N3. Note that, an address of the network configuration monitoring node N0 may be pre-registered in all the nodes belonging to the P2P network 20, or can be grasped by inquiring of the adjacent nodes for the address. For example, the node N14 can grasp the address of the network configuration monitoring node N0 by inquiring of the node N1 or N3 for the address.

In response to receiving the network ticket issue request d30, the network configuration monitoring node N0 specifies the location of a new participating node based on the information on the adjacent nodes included in the network ticket issue request d30. The network configuration monitoring node N0 makes it possible that a new participating node enters within the monitoring area of the network configuration monitoring node N0, by either of the following two methods.

1. The network configuration monitoring node N0 selects, among the nodes holding the network ticket N0 which the network configuration monitoring node N0 has issued, a node existing at the position nearest to the new participating node (the hop count to the new participating node is minimal). Next, the network configuration monitoring node N0 issues a network ticket N0A to the selected node; the network ticket N0A has a hop count obtained by adding 1 to the hop count in the investigation range d104 of the network ticket N0 having been issued to the selected node before, 2. The network configuration monitoring node N0 directly issues a network ticket N0B (the hop count in the investigation range d104 is 1) to a new participating node.

At first, a case where the above-mentioned method 1 is applied to the node N14 will be specifically described with reference to FIG. 20.

The network configuration monitoring node N0 selects, among the nodes N2, N8, and N12 holding the network ticket N0, the node N8 as the node nearest to the new participating node N14 (the hop count from each of the nodes N2 and N8 to the new participating node N14 is 2 corresponding to a node closest to the new participating node N14). Next, the network configuration monitoring node N0 issues the network ticket N0A (the hop count in the investigation range d104 is 3 and the hop count of the network ticket N0 having been issued before is 2) to the node N8. This allows the node N14 to receive the network ticket N3 issued by the node N3. This makes it possible that the node N14 is included within the investigation range d104 of the network ticket N0A, and that the node N14 enters the monitoring area of the network configuration monitoring node N0.

Next, a case where the above mentioned method 2 is applied to the node N14 will be specifically described with reference to FIG. 21.

The network configuration monitoring node N0 directly issues the network ticket N0B (the hop count in the investigation range d104 is 1) to the new participating node N14. As a result, the node N14 can receive the network ticket N0B, whereby the network N14 is included within the investigation range of the network ticket N0B and can enter the monitoring area of the network configuration monitoring node N0.

FIG. 22 is a sequence diagram showing the network configuration management method (the case in which the above-mentioned method 1 is adopted) when a new node has participated in the P2P network 10.

At first, the new participating node transmits, to one of the initially connected nodes, the investigation request inquiring whether it is within the monitoring area of the network configuration monitoring node N0 (step S210).

In response to receiving the investigation request (step S220), the one of the initially connected nodes refers to the hop count in the investigation range d104 of the previously received network ticket d10, and determines whether the hop count is larger than 1 (step S230).

When the hop count is larger than 1 (step S230: YES), the new participating node is within the monitoring area of the network configuration monitoring node N0. Therefore, the one of the initially connected nodes decreases the hop count by 1, creates a network ticket d10 with the routing information d105 to which the destination node (the new participating node) is added, and transmits the created network ticket d10 to the new participating node (step S240).

As a result, the new participating node receives the created network ticket d10 to thereby grasp that it is within the monitoring area of the network configuration monitoring node N0. The procedure of the operations thereafter is the same as the above-mentioned network ticket receiving procedure, and, accordingly, will not be described.

When the hop count is 1 (step S230: NO), the new participating node is not within the monitoring area of the network configuration monitoring node N0. Therefore, the one of the initially connected nodes transmits a notification to the new participating node; the notification indicates the new participating node is outside the monitoring area of the network configuration monitoring node N0 (step S260).

As a result, the new participating node receives the notification indicating the new participating node is outside the monitoring area of the network configuration monitoring node N0 (step S270) to thereby grasp its own node exists outside the monitoring area of the network configuration monitoring node N0.

Next, the new participating node determines whether to have received the notifications each indicating the new participating node is outside the monitoring area from all of the initially connected nodes (step S280).

When having received the notifications each indicating that the new participating node is outside the monitoring area from all of the initially connected nodes (step S280: YES), the new participating node transmits the network ticket issue request d30 to the network configuration monitoring node N0 (step S290).

When not having received the notifications each indicating that the new participating node is outside the monitoring area from at least one of the initially connected nodes (step S280: NO), the new participating node returns to step S210, and transmits the investigation request to an alternative node among all of the initially connected nodes.

In response to receiving the network ticket issue request d30 (step S300), the network configuration monitoring node N0 specifies the location of the new participating node based on the information on adjacent nodes included in the network ticket issue request d30, and selects one node existing nearest in position to the new participating node among the nodes holding the network ticket N0 (step S310).

Next, the network configuration monitoring node N0 creates the network ticket N0A to the selected node; the network ticket N0A has the hop count obtained by adding 1 to the hop count in the investigation range d104 of the previously issued network ticket N0 to the selected node, and transmits the created network ticket N0A to the selected node (step S320).

As a result, the selected node receives the network ticket N0A (step S330). Thus, the new participating node receives the network ticket N0A through the selected node. The procedure of the operations thereafter is the same as the above-mentioned network ticket receiving procedure, and, accordingly, will not be described.

FIG. 23 is a sequence diagram showing the network configuration management method (the case in which the above-mentioned method 2 is adopted) when a new node has participated in the P2P network 10.

At first, the new participating node transmits, to one of the initially connected nodes, the investigation request inquiring whether it is within the monitoring area of the network configuration monitoring node N0 (step S410).

In response to receiving the investigation request (step S420), the one of the initially connected nodes refers to the hop count in investigation range d104 of the previously received network ticket d10, and determines whether the hop count is larger than 1 (step S430).

When the hop count is larger than 1 (step S430: YES), the new participating node is within the monitoring area of the network configuration monitoring node N0. Therefore, the one of the initially connected nodes decreases the hop count by 1, creates a network ticket d10 with the routing information d105 to which the destination node (the new participating node) is added, and transmits the created network ticket d10 to the new participating node (step S440).

As a result, the new participating node receives the network ticket d10 to thereby grasp that it is within the monitoring area of the network configuration monitoring node N0. The procedure of the operations thereafter is the same as the above-mentioned network ticket receiving procedure, and, accordingly, will not be described.

When hop count is 1 (step S430: NO), the new participating node is not within the monitoring area of the network configuration monitoring node N0. Therefore the one of the initially connected nodes transmits a notification to the new participating node; the notification indicates the new participating node is outside the monitoring area of the network configuration monitoring node N0 (step S460).

As a result, the new participating node receives the notification indicating that the new participating node is outside the monitoring area of the network configuration monitoring node N0 (step S470) to thereby grasp it exists outside the monitoring area of the network configuration monitoring node N0.

Next, the new participating node determines whether to have received the notifications each indicating that the new participating node is outside the monitoring area from all of the initially connected nodes (step S480).

When having received the notifications each indicating that the new participating node is outside the monitoring area from all of the initially connected nodes (step S480: YES), the new participating node transmits the network ticket issue request d30 to the network configuration monitoring node N0 (step S490).

When not having received the notifications each indicating that the new participating node is outside the monitoring area from at least one of the initially connected nodes (step S480: NO), the new participating node returns to step S410, and transmits the investigation request to an alternative node among all of the initially connected nodes.

In response to receiving the network ticket issue request d30 (step S500), the network configuration monitoring node N0 directly transmits the network ticket N0B (the hop count in the investigation range d104 is 1) to the new participating node (step S510). As a result, the new participating node receives the network ticket N0B (step S520) to thereby allow the new participating node to: be within the investigation range d104 of the network ticket N0B, and enter the monitoring area of the network configuration monitoring node N0. The procedure of the operations thereafter is the same as the above-mentioned network ticket receiving procedure, and, accordingly, will not be described.

In the above-mentioned methods 1 and 2, an initially connected node transmits, to the new participating node, the notification indicating that the new participating node is outside the monitoring area of the network configuration monitoring node N0. In place of this, an initially connected node may transmit the notification to the network configuration monitoring node N0. In this case, in response to receiving the notification, the network configuration monitoring node N0 can grasp that the new participating node is outside the monitoring area of the network configuration monitoring node N0.

As described above, in the network configuration management method according to the embodiment, the network configuration monitoring node provides links to specified nodes without providing links to all nodes to thereby distribute the network configuration monitoring function to the specified nodes. For this reason, the load of the network configuration monitoring node can be reduced greatly.

In addition, the specified nodes to which the network configuration monitoring function is distributed make it possible to further distribute the distributed function to the nodes adjacent to their specified nodes. Moreover, this function distribution procedure is repeated for adjacent nodes so that loads do not concentrate on the specified nodes, and the loads can be distributed to all nodes in the P2P network. That is, in the network configuration management method according to the embodiment, all nodes in the P2P network share the network configuration monitoring function, and investigate the network configuration.

As a result, in the network configuration management method according to the embodiment, even if a large-scale P2P network is constructed, loads of the network configuration monitoring node can be reduced, and the network configuration of the P2P network can be grasped.

A new participating node inquires of an adjacent node, in place of the network configuration monitoring node, whether it is within the monitoring area of the network configuration monitoring node. Only when the new participating node is outside the monitoring area, the new participating node inquires of the network configuration monitoring node, and the network configuration monitoring node issues the network ticket that can reach the new participating node. Thus, when a new participating node participates in the P2P network, the number of nodes accessing the network configuration monitoring node can be greatly decreased, and loads of the network configuration monitoring node can be reduced.

In the network configuration management method according to the embodiment, modifying the value of the investigation range of the network ticket allows the network configuration of various scaled P2P networks to be managed, and loads of the network configuration monitoring node to be adjusted. In other words, optimizing the hop count in the investigation range of the network ticket and the number of the network tickets which the network configuration monitoring node issues allows the efficient network configuration investigation to be carried out.

A route along which the network tickets are issued is recorded as a history. Therefore, each of the nodes can avoid unnecessary issue of the network tickets.

The embodiment of the present invention has so far been described. However, the present invention is not so limited to the above-mentioned embodiment, and the embodiment of the present invention may be variously changed or modified within the scope without departing from the scope of the present invention. The changed or modified embodiments are also included within the scope of the present invention.

The invention claimed is:

1. A network configuration investigating device constituting each node in a P2P network having a network monitoring node, the network monitoring node issuing a network ticket requesting to investigate nodes existing within a predetermined range from a node having received the network ticket, and managing a network configuration by using information on nodes having been investigated by each of nodes having received the network ticket, the network configuration investigating device comprising:

a network ticket receiving means for receiving the network ticket from the network monitoring node or other node;

a network configuration information acquiring means for investigating information on other nodes within range graspable by itself among the predetermined range, and acquiring a result of the investigation as network configuration information;

a network ticket issuing means for, when investigating beyond the range graspable by itself, issuing a new network ticket to other nodes, and requesting the investigation based on the new network ticket;

a network configuration information receiving means for receiving the network configuration information from the other nodes to which the new network ticket has been issued; and a network configuration information transmitting means for transmitting the network configuration information acquired by the network configuration information acquiring means and the network configuration information received by the network configuration information receiving means to the network monitoring node having transmitted the network ticket or the other node having transmitted the network ticket.

2. The network configuration investigating device according to claim 1, wherein the network ticket includes information on investigation range, the information in which the investigation range investigated by the node receiving this network ticket is described, the network configuration information acquiring means investigates information on each of other nodes adjacent to its own node, and acquires a result of the investigation as the network configuration information, the network ticket issuing means, when the investigation range of the network ticket having been received is beyond the range graspable by itself, issues the new network ticket to each of the other nodes adjacent to its own node, the new network ticket in which the information on the investigation range about a destination node is recorded.

3. The network configuration investigating device according to claim 2, wherein the network ticket further includes a ticket ID which is given every one investigation of the network monitoring node, the ticket ID identifying a same investigation, the network configuration information acquiring means acquires the network configuration information associated with the ticket ID of the network ticket having been received, and the network ticket issuing means issues the new network ticket associated with the ticket ID of the network ticket having been received, the network configuration investigating device further comprises:

a network configuration information integrating means for integrating the network configuration information acquired by the network configuration information acquiring means and the network configuration information received by the network configuration information receiving means, based on the ticket ID;

the network configuration information transmitting means transmits the network configuration information integrated by the network configuration information integrating means to the network monitoring node having transmitted the network ticket or the other node having transmitted the network ticket.

4. The network configuration investigating device according to claim 3, wherein the network ticket receiving means, when the ticket ID of an alternative network ticket having already been received is the same as the ticket ID of the network ticket received from the network monitoring node or the other node, abandons any one of the alternative network ticket and the network ticket received from the network monitoring node or the other node.

5. The network configuration investigating device according to claim 3, wherein the network ticket further includes information on issue route, the information in which the information on the nodes which the network ticket has sequentially passed, setting the network monitoring node as a starting point is described, the network ticket issuing means, when one of the other nodes adjacent to its own node is described in the information on the issue route, does not issue the new network ticket to the one of the other nodes adjacent to its own node.

6. The network configuration investigating device according to any one of claims 3, further comprising:

an investigation request receiving means for receiving an investigation request from an adjacent node newly having participated in the P2P network, the investigation request inquiring whether the adjacent node newly having participated is within a monitoring area of the network monitoring node;

a monitoring area determining means for, when the investigation range of the network ticket having been received by its own node covers the node having transmitted the investigation request, determining the node having transmitted the investigation request is within the monitoring area of the network monitoring node, and, when the investigation range of the network ticket having been received by its own node does not cover the node having transmitted the investigation request, determining the node having transmitted the investigation request is outside the monitoring area of the network monitoring node;

a within monitoring area notification transmitting means for, when the monitoring area determining means determines the node having transmitted the investigation request is within the monitoring area of the network monitoring node, transmitting a new network ticket to the node having transmitted the investigation request; and an outside monitoring area message transmitting means for, when the monitoring area determining means determines the node having transmitted the investigation request is outside the monitoring area of the network monitoring node, transmitting a notification to the node having transmitted the investigation request or the network monitoring node, the notification indicating the node having transmitted the investigation request is outside the monitoring area of the network monitoring node.

7. The network configuration investigating device according to claim 6, further comprising:
   a investigation request transmitting means for, when its own node has participated in the P2P network, transmitting the investigation request to each of the other nodes adjacent to its own node, the investigation request inquiring of whether its own node is within the monitoring area of the network monitoring node; and
   a investigation result receiving means for receiving the new network ticket as a notification indicating that its own node is within the monitoring area of the network monitoring node, or a notification indicating that its own node is outside the monitoring area of the network monitoring node from each of the other nodes adjacent to its own node.

8. The network configuration investigating device according to claim 7, further comprising:
   a network ticket issue request transmitting means for, when having received the notification indicating that its own node is outside the monitoring area of the network monitoring node from all of the other nodes adjacent to its own node, transmitting a new request to the network monitoring node, the new request requesting to issue a new network ticket.

9. The network configuration investigating device according to any one of claims 2, wherein
   in the information on the investigation range, a hop count from the node having received the network ticket is described,
   the network ticket issuing means, refers to the hop count of the network ticket having been received, when the referred hop count is larger than 1, decrements the referred hop count by 1, and set the decremented hop count to the information on the investigation range of the destination node.

10. A network configuration investigating program product readable by each node in a P2P network having a network monitoring node, the network monitoring node issuing a network ticket requesting to investigate nodes existing within a predetermined range from a node having received the network ticket, and managing a network configuration by using information on nodes having been investigated by each of nodes having received the network ticket, the network configuration investigating program product comprising:
   a non-transitory computer-readable medium storing a computer program including:
   a first instruction that causes a computer included in the node to receive the network ticket from the network monitoring node or other node;
   a second instruction that causes the computer to investigate information on other nodes within range grasped by itself among the predetermined range, and acquire a result of the investigation as network configuration information;
   a third instruction that causes the computer to, when investigating beyond the range grasped by itself, issue a new network ticket to other nodes, and request the investigation based on the new network ticket;
   a fourth instruction that causes the computer to receive the network configuration information from the other nodes to which the new network ticket has been issued; and
   a fifth instruction that causes the computer to transmit the network configuration information acquired by the computer and the network configuration information received by the computer to the network monitoring node having transmitted the network ticket or the other node having transmitted the network ticket.

11. A method for managing a network configuration in a network configuration management system comprising a plurality of nodes constituting a P2P network, and a network monitoring node managing a network configuration of the P2P network, the method comprising:
   issuing a network ticket to each of nodes adjacent to its own node, the network ticket requesting to investigate nodes existing within a predetermined range from a node having received the network ticket, in the network monitoring node;
   the network ticket comprising: a ticket ID which is given every one investigation of the network monitoring node, the ticket ID identifying a same investigation; and information on investigation range, the information in which the investigation range investigated by the node receiving this network ticket is described;
   receiving the network ticket from the network monitoring node or other node, in the node;
   referring to the information on the investigation range of the network ticket having been received, in the node;
   issuing, when the investigating range referred to is beyond the range graspable by itself, a new network ticket to each of other nodes adjacent to its own node, the new network ticket in which, same ticket ID as the ticket ID of the network ticket having been received, and the information on the investigation range about a destination node are recorded, and requesting the investigation based on the new network ticket, in the node;
   investigating the information on each of the nodes adjacent to its own node, and acquiring a result of the investigation as network configuration information associated with the ticket ID of the network ticket having been received, in the node;
   receiving the network configuration information from the other adjacent nodes to which the new network ticket has been issued, in the node;
   transmitting the acquired network configuration information and the received network configuration information to the network monitoring node having transmitted the network ticket or the other node having transmitted the network ticket, in the node;
   receiving the network configuration information from each of the nodes adjacent to its own node, in the network monitoring node; and
   grasping the whole network configuration of the P2P network, based on each of the network configuration information having been received, in the network monitoring node.

12. A network configuration management system comprising a plurality of nodes constituting a P2P network, and a network monitoring node managing a network configuration of the P2P network wherein
   the network monitoring node comprises:
   a first network ticket issuing means for issuing a network ticket to each of nodes adjacent to its own node, the network ticket requesting to investigate nodes existing within a predetermined range from a node having received the network ticket; and
   a network configuration grasping means for receiving information on nodes from each of the nodes adjacent to its own node, the information which the adjacent nodes have investigated or other nodes have investigated, the other nodes of which the adjacent nodes has requested the investigation, and grasping the whole network configuration of the P2P network;

the network ticket comprises:

a ticket ID which is given every one investigation of the network monitoring node, the ticket ID identifying a same investigation; and information on investigation range of the network configuration, the information in which the investigation range being investigated by the node receiving the network ticket is described;

the node comprises:

a network ticket receiving means for receiving the network ticket from the network monitoring node or other node;

a investigation referring means for referring to the information on the investigation range of the network ticket having been received;

a network ticket issuing means for, when the investigating range referred to is beyond the range graspable by itself, issuing a new network ticket to each of other nodes adjacent to its own node, the new network ticket in which, same ticket ID as the ticket ID of the network ticket having been received, and the information on the investigation range about a destination node are recorded, and requesting the investigation based on the new network ticket;

a network configuration information acquiring means for investigating the information on each of the nodes adjacent to its own node, and acquiring a result of the investigation as network configuration information associated with the ticket ID of the network ticket having been received;

a network configuration information receiving means for receiving the network configuration information from the other adjacent nodes to which the new network ticket has been issued; and a network configuration information transmitting means for transmitting the network configuration information acquired by the network configuration information acquiring means and the network configuration information received by the network configuration information receiving means to the network monitoring node having transmitted the network ticket or the other node having transmitted the network ticket.

* * * * *